(12) United States Patent
Kumar et al.

(10) Patent No.: US 10,354,541 B2
(45) Date of Patent: Jul. 16, 2019

(54) TUTOR MODEL BUILDING SYSTEM

(71) Applicant: Raytheon BBN Technologies Corporation, Cambridge, MA (US)

(72) Inventors: Rohit Kumar, Belmont, MA (US); Matthew E. Roy, Arlington, MA (US); R. Bruce Roberts, Cambridge, MA (US)

(73) Assignee: RAYTHEON BBN TECHNOLOGIES CORPORATION, Cambridge, MA (US)

( * ) Notice: Subject to any disclaimer, the term of this patent is extended or adjusted under 35 U.S.C. 154(b) by 513 days.

(21) Appl. No.: 14/789,386

(22) Filed: Jul. 1, 2015

(65) Prior Publication Data

US 2016/0042297 A1   Feb. 11, 2016

Related U.S. Application Data

(60) Provisional application No. 62/020,026, filed on Jul. 2, 2014.

(51) Int. Cl.
*G01N 33/48* (2006.01)
*G09B 7/00* (2006.01)

(52) U.S. Cl.
CPC ..................................... *G09B 7/00* (2013.01)

(58) Field of Classification Search
None
See application file for complete search history.

(56) References Cited

U.S. PATENT DOCUMENTS

2008/0254437 A1 * 10/2008 Heffernan .............. G09B 7/077
434/362

OTHER PUBLICATIONS

Aleven, V., McLaren, B. M., Sewall, J., Koedinger, K. R.: A new paradigm for intelligent tutoring systems: Example-tracing tutors. International Journal of Artificial Intelligence in Education, 19(2), 105-154 (2009).

Koedinger, K. R., Aleven, V., Heffernan, N., McLaren, B, M., Hockenberry, M.: Opening the Door to Non-Programmers: Authoring Intelligent Tutor Behavior by Demonstration. In Lester, J.C., Vicario, R.M., Paraguaçu F. (eds.), Proceedings of Seventh International Conference on Intelligent Tutoring Systems, ITS 2004, 162-174. Berlin: Springer Verlag (2004).

Aleven, V., McLaren, B. M., Sewall, J., Koedinger, K.: The Cognitive Tutor Authoring Tools (CTAT): Preliminary evaluation of efficiency gains. In Ikeda, M., Ashley, K. D., Chan, T. W. (eds.), Proceedings of the Eighth International Conference on Intelligent Tutoring Systems, ITS 2006, pp. 61-70. Berlin: Springer Verlag (2006).

(Continued)

*Primary Examiner* — Larry D Riggs, II
(74) *Attorney, Agent, or Firm* — Daly, Crowley, Mofford & Durkee, LLP

(57) ABSTRACT

A tutor model building system includes a user interface device having a monitor to present to a user a predetermined learning interface of a problem requiring a solution and an input device for the user to enter data showing actions taken to arrive at a solution into the system, a computer to capture the actions entered by the developer user and to generate a behavior demonstration associated with the actions entered and to combine a plurality of behavior demonstrations created from a plurality of user entered data to a behavior graph, and an output device to provide the behavior graph to an authoring tool.

20 Claims, 46 Drawing Sheets

(56) References Cited

OTHER PUBLICATIONS

Johnson, M., Eagle, M., Stamper, J., Barnes, T.: An Algorithm for Reducing the Complexity of Interaction Networks, In D'Mello, S. K., Calvo, R. A., Olney, A. (eds.), Proceedings of the Sixth International Conference on Educational Data Mining, 248-251 (2013).

McLaren, B.M., Koedinger, K.R., Schneider, M., Harrer, A., Bollen, L: Bootstrapping Novice Data: Semi-Automated Tutor Authoring Using Student Log Files. In Proceedings of the Workshop on Analyzing Student-Tutor Interaction Logs to Improve Educational Outcomes, 7th International Conference on Intelligent Tutoring Systems (2004).

* cited by examiner

Force on one particle by two other particles

Three charged particles are located according to the diagram below. What is the net force on the +3.0 mC particle?

$q_1$ +5.0 mC 12 cm $\theta = 90°$ $q_2$ +3.0 mC    7.5 cm    $q_3$ -2.0 mC

☐ A. $1.3 \times 10^7$ N; 44° North of East

☐ B. $1.3 \times 10^7$ N; 44° South of East

☐ C. $1.3 \times 10^4$ N; 44° North of East

☐ D. $1.3 \times 10^4$ N; 44° South of East

Submit Answer

---

Label the diagram

Label the diagram.

$q_1$ +5.0 mC 12 cm $\theta = 90°$ $q_2$ +3.0 mC    7.5 cm    $q_3$ -2.0 mC

◁   1/6   ▷

Help

Problem 6
What is the magnitude of the net force on the $-2\,\mu C$ charge?

- A. $2.25 \times 10^{-2}\,N$
- B. $2.85 \times 10^{-2}\,N$
- C. $1.65 \times 10^{-2}\,N$
- D. $1.05 \times 10^{-2}\,N$ Submit | Help Step 6.1
Which of the following pertain to the force between two two charged particles?

- A. Newton's Law
- B. Coulomb's Law
- C. Ohm's Law
- D. Joule's Law

Previous | Help | Next

Step 6.2
Notate the following diagram using the given symbols
$(Q_1, Q_2, Q_3, r_{12}, r_{23}, r_{13})$ Previous | Help | Next Step 6.3
Calculate the force between $Q_1$ and $Q_3$.
$$F_{13} = k\frac{Q_1 Q_3}{r_{13}^2}$$
$F_{13} = $ Previous | Help | Next Step 6.4
Calculate the force between $Q_2$ and $Q_3$.
$$F_{23} = k\frac{Q_2 Q_3}{r_{23}^2}$$
$F_{13} = $ Previous | Help | Next Step 6.5
Calculate the magnitude of the net force on $Q_3$.
$F_3 = F_{13}\ \square\ F_{23}$ Previous | Help | Next

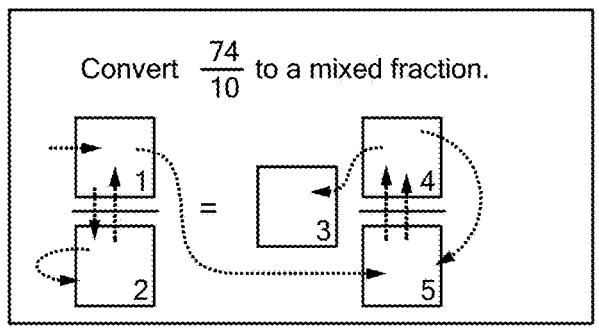
*FIG. 6a*
```
  . . .
< 1,  10 >
< 2,  74 >
< 2,  10 >
< 1,  74 >
< 5,  10 >
< 4,   4 >
< 5,   5 >
< 4,   2 >
< 3,   7 >
  . . .
```
*FIG. 6b*
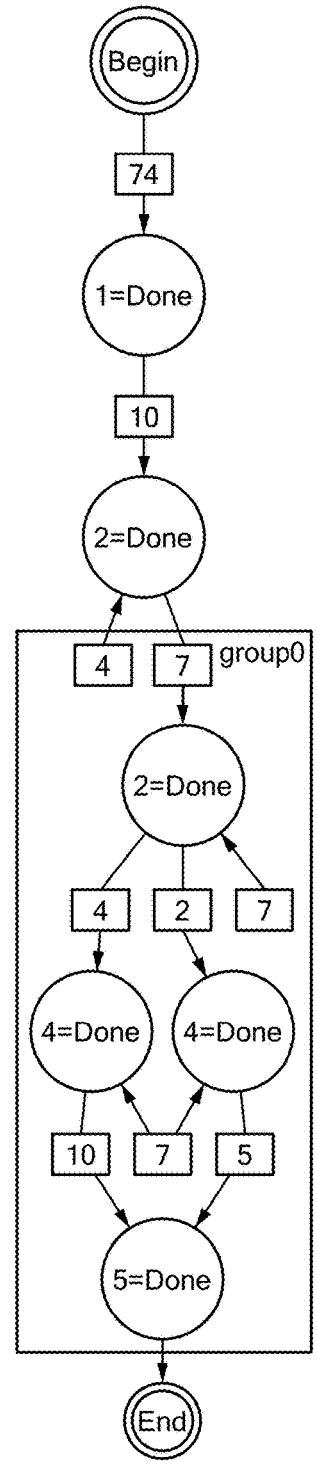
*FIG. 6c*

FIG. 8

Conjugation excercises

Type in the correct conjugation of the verb *aller* for each sentence.
You do not have to worry about capitals or punctuation.

(1/8)
Ils ____ a Londres.

Answer:

[Try]

Intonation

Here is how the Fox greets the Crow in Jean de La Fontaine's fable
Le corbeau et le renard. Put back all the syllables spelled phonetically
in their correct order then practice by reading each completed verse.

[Hint]

Drag and drop the syllables in their correct order

[Listen] [sieu] [bon] [jour] [cor] [du] [e] [bo] [meu]

[Check]

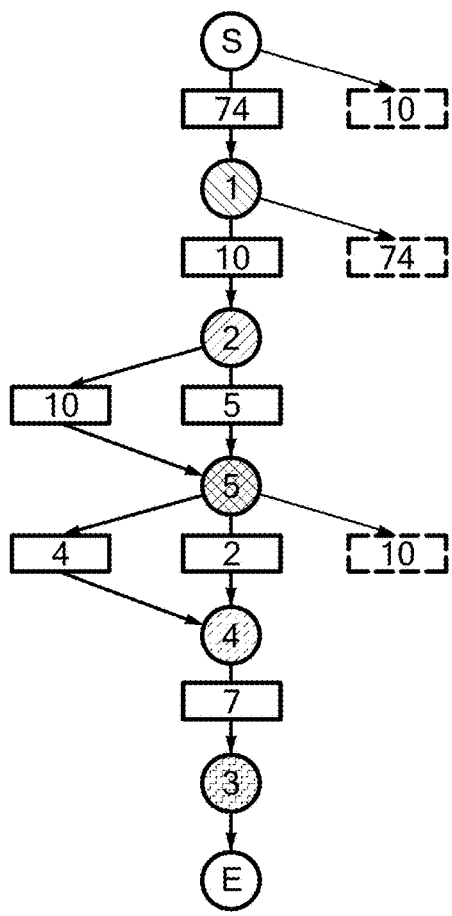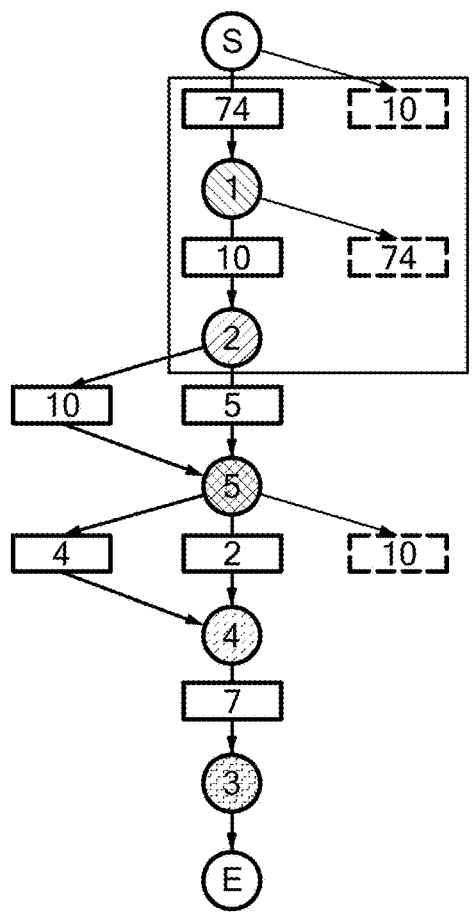
*FIG. 24*  *FIG. 25*

TUTOR MODEL BUILDING SYSTEM

CROSS REFERENCE TO RELATED APPLICATIONS

This application claims the benefit under 35 U.S.C. § 119(e) of U.S. Provisional Application No. 62/020,026 filed Jul. 2, 2014, which application is incorporated herein by reference in its entirety.

STATEMENTS REGARDING FEDERALLY SPONSORED RESEARCH

This invention was made with Government support under Contract No. N00014-12-C-0535 awarded by the Department of the Navy. The Government has certain rights in this invention.

FIELD OF THE INVENTION

This disclosure relates generally to learning systems and more particularly to a technique to provide an example tracing tutoring system for learning.

BACKGROUND

Various techniques have been proposed to supply learning systems. One type of learning system is an example-tracing tutor (ETT) having been used to build intelligent tutoring systems (ITS). The popularity of this type of system is due to the reduction of effort and expertise requirements associated with building these tutors. The effectiveness of these systems is based in their ability to capture learner behavior at a fine-grained level and provide step-by-step guidance in structured learning activities. In the present disclosure, a technique for building a tutor model system will be disclosed.

SUMMARY

In accordance with the present disclosure, a tutor model building system includes: a user interface device having a monitor to present to a user a predetermined learning interface of a problem requiring a solution and input device for the user to enter data showing actions taken to arrive at a solution into the system: a computer to capture the actions entered by a developer user and to generate a behavior demonstration associated with the actions entered and to combine a plurality of behavior demonstrations created from a plurality of user entered data to a behavior graph; and an output device to provide the behavior graph to an authoring tool. With such an arrangement, a sequence of behavior events are captured from a multiple of users to provide preliminary behavior graphs derived from the events. The latter events are combined and graphs are generalized and annotated across demonstrations to provide better behavior graphs to an authoring tool which will then reduce the authoring effort of a domain expert to finalize an intelligent tutoring system.

Further in accordance with the present disclosure, a method for developing a tutor model includes: using a predetermined learning interface, capturing various actions taken by a user to arrive at a solution; generating a behavior demonstration for the various actions taken for each user solution; combining the behavior demonstrations to one behavior graph; and providing the behavior graph to a tutor authoring tool. With such a technique, the inputs from a plurality on non-experts solving a solution is used to create a better behavior graph which reduces the effort required by an expert during the authoring stage of creating an intelligent tutoring system.

The details of one or more embodiments of the disclosure are set forth in the accompanying drawings and the description below. Other features, objects, and advantages of the disclosure will be apparent from the description and drawings, and from the claims.

DESCRIPTION OF DRAWINGS

FIG. 1 is a diagram of a Physics problem rendered in a learning environment;

FIG. 2 is a diagram of an author application used to create/edit a problem:

FIG. 3 is a diagram of a model application used for demonstrating and editing behavior graphs:

FIG. 4 is a snapshot of an administrate application;

FIG. 5 is a diagram of a Physics problems and its solution UI in the learning environment;

FIG. 6a is a diagram of a UI of a sample problem step;

FIG. 6b is a diagram of behavior demonstration data;

FIG. 6c is a diagram of a subsection of a behavior graph;

FIG. 8 is a diagram of a user interface of a problem and its steps;

FIGS. 10a-1, 10a-2, 10a-3, 10a-4, 10a-5, 10a-6 and 10a-7 and collectively referred to FIG. 10a is a diagram of an automatically generated behavior graph of a first algorithm for the problem shown in FIG. 8;

FIGS. 10b-1, 10b-2, 10b-3, and 10b-4 collectively refer to as FIG. 10b is a diagram of an automatically generated behavior graph of a second algorithm for the problem shown in FIG. 8;

FIGS. 10c-1, 10c-2, 10c-3 and 10c-4 collectively referred to as FIG. 10c is a diagram of an automatically generated behavior graph of a third algorithm for the problem shown in FIG. 8;

FIGS. 10d-1, 10d-2, 10d-3, 10d-4, and 10d-5 collectively referred to as FIG. 10d is a diagram of an automatically generated behavior graph of a fourth algorithm for the problem shown in FIG. 8;

FIG. 13 is a diagram of example steps from a problem from a French online course:

FIG. 24 is a diagram showing a sequence as edges are generated:

FIG. 25 is a diagram showing a sequence as groups are identified; and

Like reference symbols in the various drawings indicate like elements.

DETAILED DESCRIPTION

The present disclosure describes techniques to develop a domain-independent platform for building and delivering problem-solving based learning activities over the web and more specifically a device to provide a behavior graph to an authoring tool for a intelligent tutoring system. The choice of problem solving as the underlying learning activity is motivated by its applicability to a wide range of STEM domains and focused on applying the learning platform to build, for example, a high school Physics learning system covering topics in Electricity and Magnetism.

The platform comprises an extensible learning environment for students, administration tools for educators and a workbench for content development and system maintenance. The workbench includes a number of applications for developing and maintaining learning content. i.e. problems, as well as for developing corresponding tutor models. Before presenting the functionality of these tools, we will briefly describe the problem solving learning environment.

Figures 1, 10A:
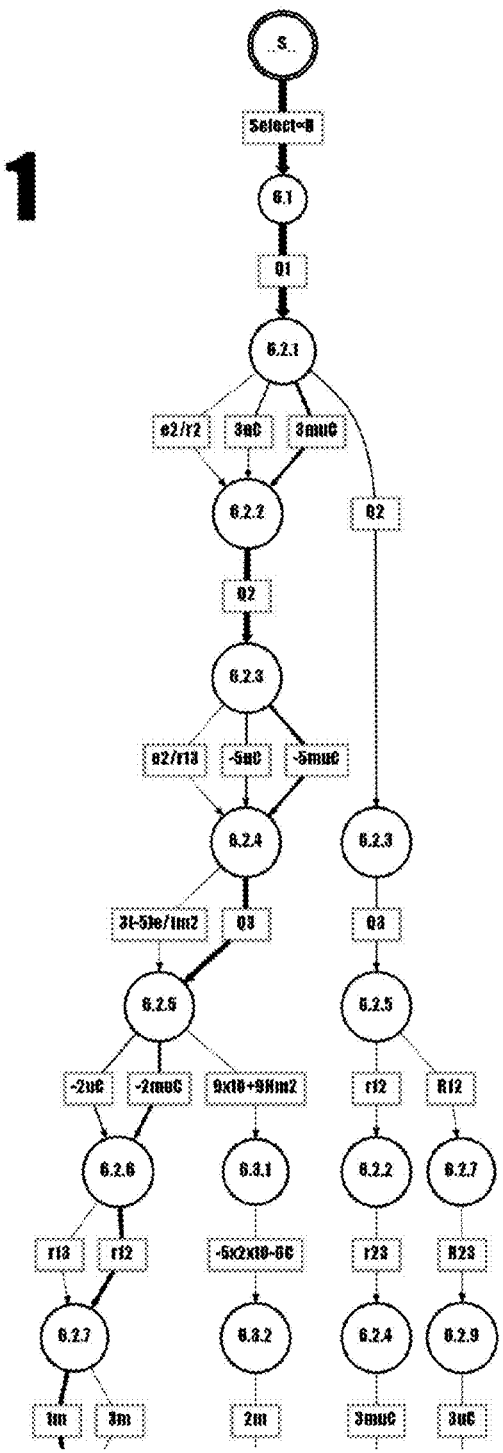

FIG. 1 shows a rendering of a Physics problem in our learning environment. The user interface (UI) employs a tile metaphor to allow use of the learning environment on multiple web enabled devices including touch screen devices with relatively low screen resolution (such as tablets and smart phones). The left tile shows a problem statement. Learners can solve a given problem without tutor assistance or can click on the help button in which case a decomposition of the problem into a series of solution steps is presented. We have implemented a tutoring engine that uses example-tracing tutors (ETT) to provide feedback and scaffolded hints to the learners.

The workbench that is part of the learning platform comprises three applications. First, the Author application is used to create new problems and the corresponding user interfaces to provide guided solutions to the problem. Second, the Model application uses a programming by demonstration approach to facilitate the development of example-tracing tutor models. Third, the Administrate application provides content management functionality to the authors. The Author and Model applications are used together for the three stages of ETT development.

Figures 2, 10A:
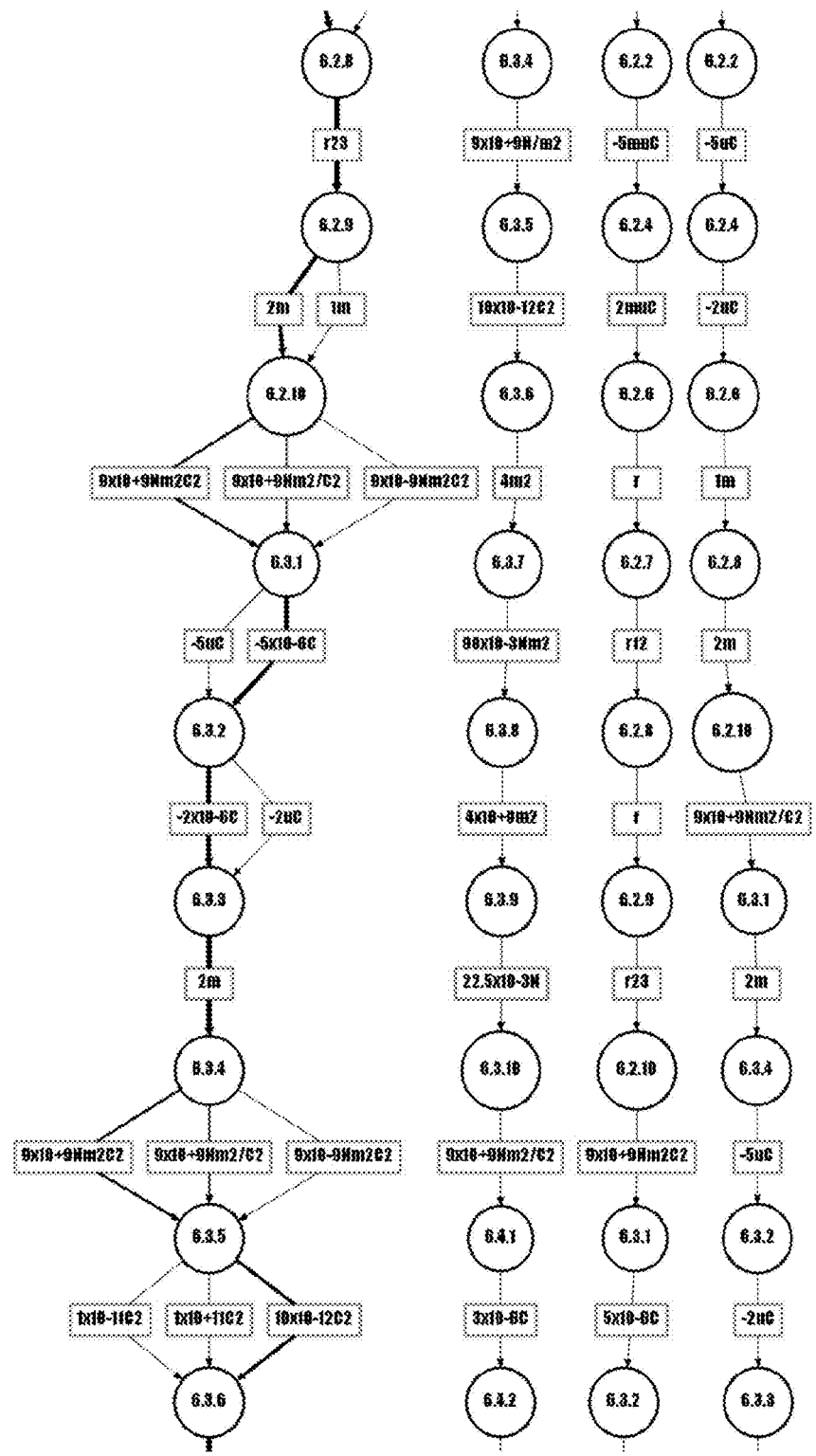

FIG. 2 shows the Author application being used to edit the problem shown in FIG. 1. Problems are authored as a collection of fixed size tiles. The first tile contains the problem statement which is followed by an optional sequence of solution steps. As a content editing software, the functionality of the Author application can be decomposed into three levels based on the granularity of the elements being edited. First, functionality for editing the entire problem includes tools for managing and navigating between tiles. Second, a WYSIWYG and direct manipulation paradigm is employed for editing each tile using a palette of VI elements as well as a number of commonly used editing operations (e.g. cut, copy, paste, move, align, etc.). At the finest level of granularity, properties of each UI element can be edited. These properties include position, size and contents. The three levels of granularity are organized left-to-right in the application as shown in FIG. 2.

Several advanced features are supported in this editor. Necessary for a wide range of STEM domains, authors can embed LaTeX style mathematical expressions at all levels of granularity. Second, besides commonly used UI elements such as labels, text fields and combo-boxes, authors can import graphics and animations using the image element. The Administrate application provides the functionality to manage graphics content. Third, step layouts can be stored as templates, which can then be used to create similar steps without the need for repeating the layout design.

The Model application is used to construct and maintain example-tracing tutor models for each problem. This application provides two sets of functionalities for this purpose. First, model developers can demonstrate multiple solution paths to a problem and use automatic tutor modeling algorithms to automatically induce a generalized tutor model, a behavior graph, from these demonstrations. Second, the developers can manually modify a visual representation of the behavior graph to further generalize as well as to annotate the graph with feedback and knowledge component associations.

Figures 3, 10A:
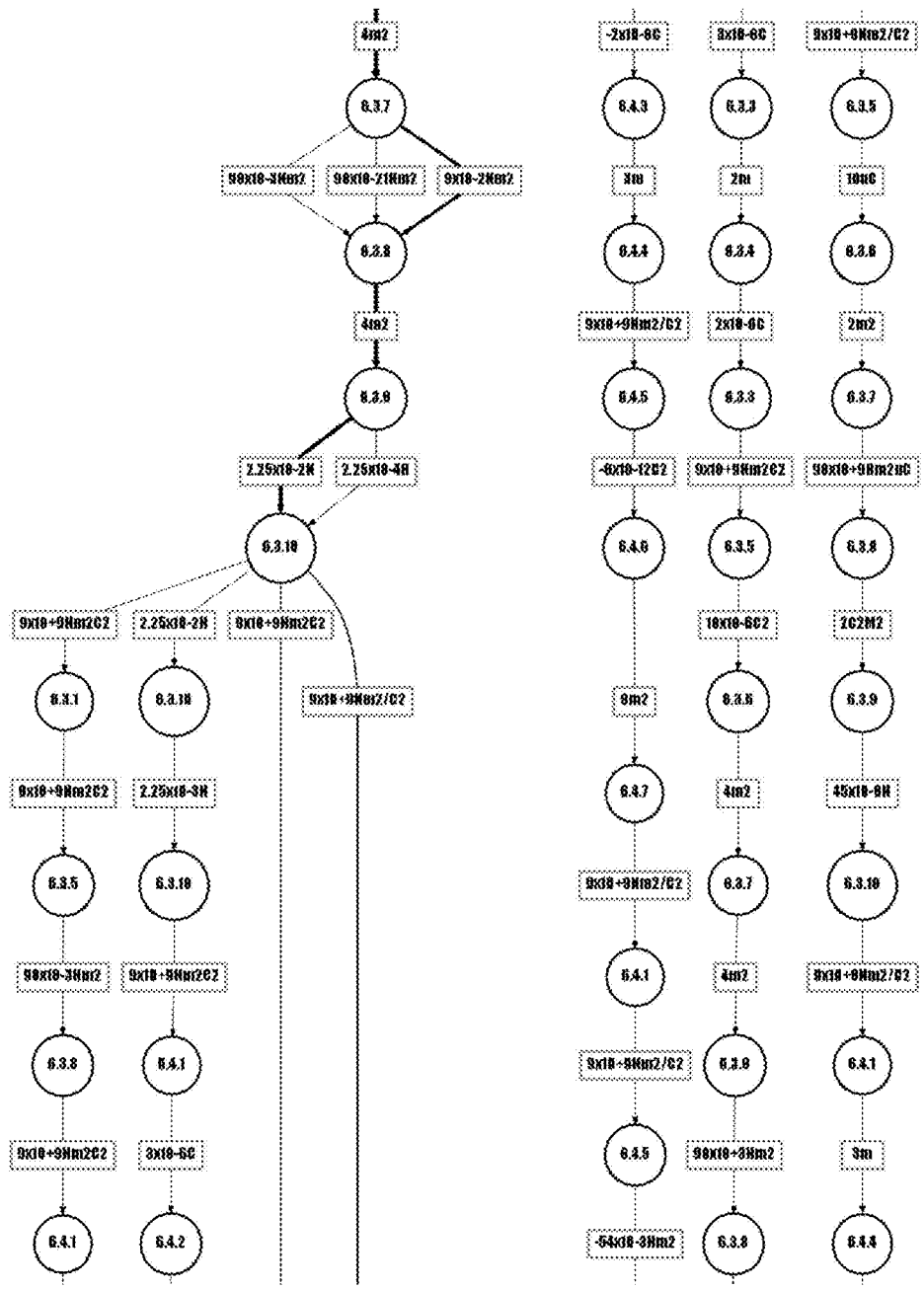

FIG. 3 shows a screenshot of the Model application. The demonstration interface, shown on the left hand side of FIG. 3, visualizes a problem exactly the way as it is seen in the learning environment. Domain experts can use this interface to create multiple solution demonstrations. On the right hand side of FIG. 3, we see a behavior graph that was automatically generated using two solution demonstrations. An algorithm as to be described further hereinafter, which has been integrated with our authoring tools, was used to generate this graph. Model developers can edit the behavior graph using the tools and properties panel (show in the middle). As discussed above, this is necessary not only for fixing potential errors introduced by the automatic graph generation algorithm but also for annotating the graph.

Figures 4, 10A:
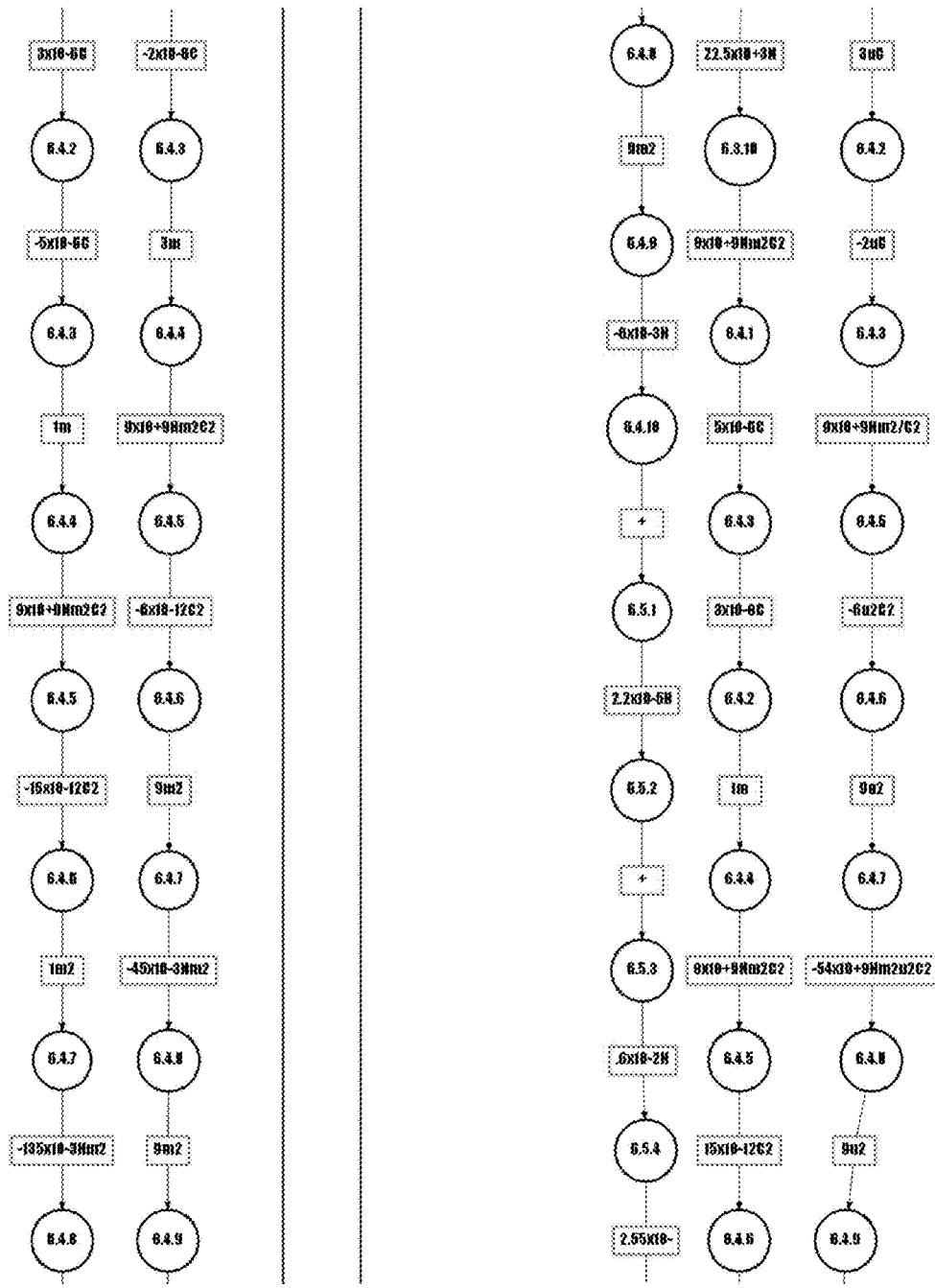

A snapshot of the Administrate application is shown in FIG. 4. The Administrative application comprises three panels. On the left hand side, the curriculum management panel is used to organize collections of problems under curricular units. This panel uses a tree based UI to mimic the curriculum organization typically used by text-books. On the right hand, the resource manager is used to manage content resources such as graphics that may be used to author problems. This widget uses a tag-based metaphor for organizing the resources. Multi-tag querying is used to search through the resources. In the center panel, a task list is provided to the authors to help them keep track of their content development tasks. Note that the curriculum panel is used to launch the Author and Model applications. The contents of the curriculum and resource panels are shared between authors, whereas the task panel is private to each author.

The learning platform is accessible over the web for all intended types of users including learners, educators and content developers. The software is compatible with the latest version of all major web browsers on desktop platforms and does not require any third party plugins (e.g. Flash). Standards compliant web-browsers on several prominent handheld devices will also be supported for the functionality used by learners. The focus on a web-based delivery is motivated by consideration for effortless wide access to the software by the users. Furthermore, centralization of software deployment allows rapid dissemination of new features as well as collection of fine grained interaction logs to support usability and efficacy research.

One of the key challenges for designing authoring tools is achieving the balance between offering rich representational power without requiring the users to undergo extensive training for using the software. We tackle this challenge by adopting familiar UI metaphors in application design. The Administrate application, for example, uses metaphors such as trees and tags used by mainstream software applications such as file managers. In the case of the Author application, we adopt interaction conventions used by popular editing software such as Microsoft Office and Google Docs. Following this, problem authoring uses a WYSIWYG metaphor. Furthermore, the tile size used in the Author application is based on the design of the learning environment to eliminate the gap between content production (by authors) and consumption (by learners).

Templates facilitate rapid content production by exploiting the fact that there are often similarities in content. Our workbench currently implements a simplified non-parameterized templatization, as seen in FIGS. 2 and 4. Content developers can create and reuse templates of problems and solution steps. The functionality allows extensions to parameterized templates. Automated content generation techniques can then be applied to such templates.

In addition to the use of templates to reduce authoring effort, data-driven techniques to automate tutor model development can be used. These techniques elicit multiple solution demonstrations for each problem and automatically generate a partially annotated behavior graph. Development of robust and data efficient algorithms for automatic tutor model creation is one of the research directions associated with authoring in our current effort. Design of interfaces that allow content developers who may not be algorithmic experts to use these techniques is one of the considerations shaping the Model application. In addition to the use of automated tutor modeling techniques to reduce model development effort, we are tightly coupling our authoring applications to each other. Specifically, this helps the Model application create robust behavior graphs using the problem structure representation generated by the Author application.

The large volume and high quality of content required for a production quality ITS usually requires coordinated efforts of multiple content developers. The workbench supports collaboration between developers by sharing resources and the curriculum tree between the authors. Automatic version control is provided behind the scenes to keep track of updates.

It should be noted that the choice of ETTs as the underlying intelligent tutoring approach has a significant influence on the design of our workbench. In this aspect, these applications build upon the functionality of some existing general purpose authoring tools such as the Cognitive Tutor Authoring Tools (CTAT), the GIFT framework and the Assistments Builder. We are currently using external graph authoring software tools for developing domain models. The representations generated by these tools are manually migrated into our software to annotate knowledge component associations in tutor models. Alternatively, integrating existing domain modeling applications into our workbench can be implemented. Furthermore, the collaborative authoring functionality can implement access locking to prevent simultaneous overwriting of content by multiple authors. The system can also expose the representation underlying our problem definitions and models for power users. This functionality will be associated with automatic validity checks.

Example-Tracing Tutors (ETI) are a popular and effective tutor model that have been used to build ITS for a wide range of learning domains since their introduction over a decade ago. The popularity of this model is rooted in the reduction of effort and expertise requirements associated with building these tutors. This objective is furthered by the availability of well-developed general purpose authoring tools such as the Cognitive Tutors Authoring Tools (CTAT) and the ASSISTment Builder. The effectiveness of these models is based in their ability to capture learner behaviors at a fine grained level and provide step-by-step guidance in structured learning activities.

Building ETTs involve three stages: (1) User interface development, (2) Behavior demonstration. (3) Generalization and Annotation of the behavior graph. While authoring tools listed earlier support non-programmers through each of these stages, the work in all of these stages is completely manual. Note that while this process does not require ITS developers to have advanced computing expertise, their expertise in the learning domain is exercised. Web based tools, such as the ASSISTment Builder, have enabled a community of educators with the relevant domain and pedagogical expertise to participate in this process of building ETTs.

As ITS are being deployed to a large active user pool, it is now possible to pilot the user interface with a small sample of learners to collect multiple behavior demonstrations. In this manner, the effort of behavior demonstration (Stage 2) can be distributed to a scalable workforce. An algorithm that can automatically create a generalized behavior graph from the multiple demonstrations collected in this way can significantly reduce the (Stage 3) effort of the ITS developer.

Figures 5, 10A:
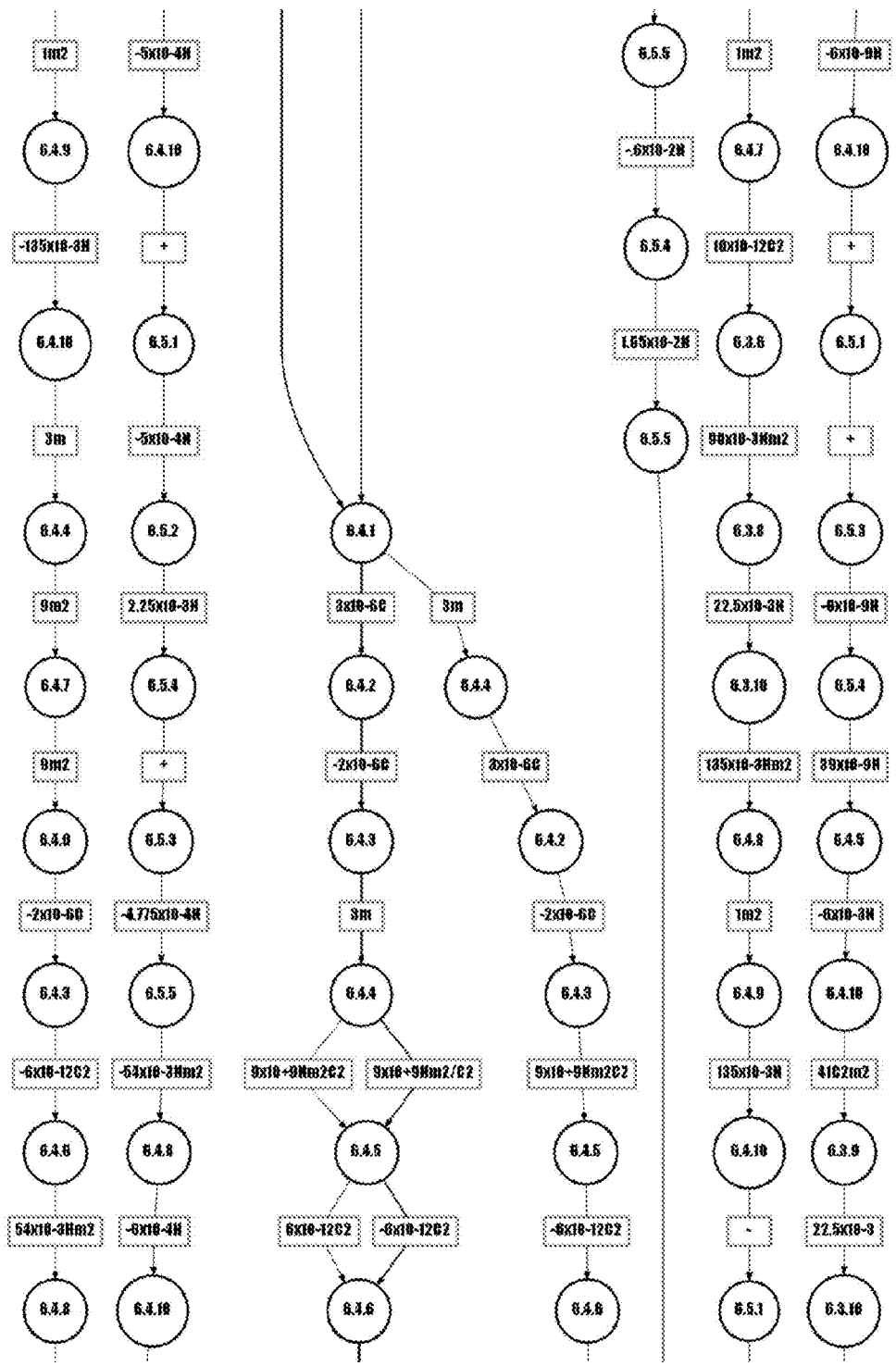

FIG. 5 shows a rendering of a Physics problem in our learning environment. The UI employs a tile metaphor to allow use of the learning environment on multiple web enabled devices including touch screen devices with relatively low screen resolution (such as smart phones). The first tile shows a problem statement. Learners can solve a given problem without tutor assistance or can click on the help button in which case the decomposition of the problem into a series of solution steps is presented. In addition to the access to this decomposition upon requesting help, we have implemented a tutoring engine that uses ETTs to provide feedback and scaffolded hints to the learners. The workbench includes two separate tools for supporting the three stage ETT development process. First, a WSIWYG problem authoring tool allows nonprogrammers to build user interfaces. The solution steps shown above showcase some of the UI elements that are available to the authors. Second, a model building tool enables them to demonstrate problem solutions and edit/annotate the behavior graph which is accessible side by side within the same tool.

Figures 6, 10A:
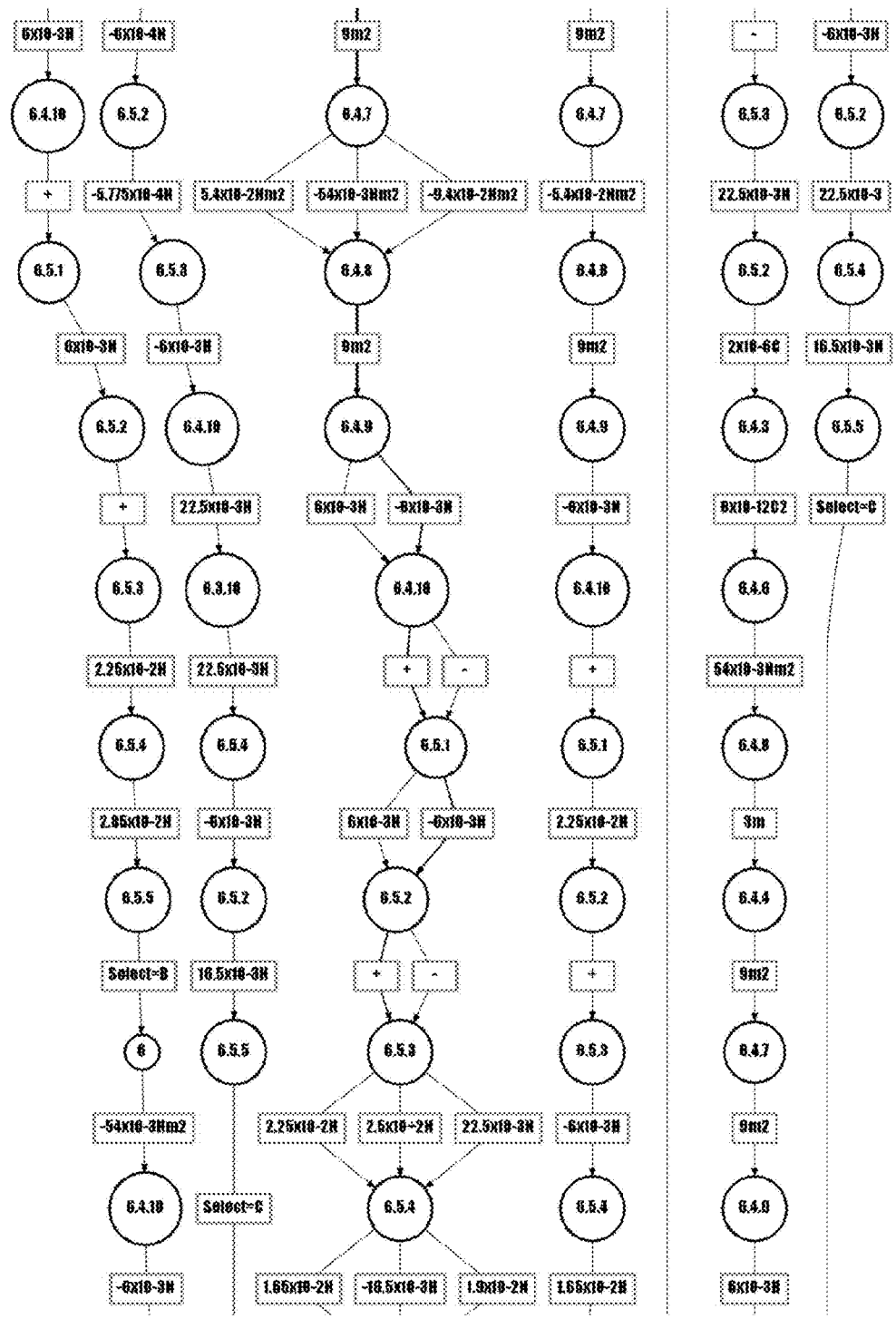
Figures 7, 10A:
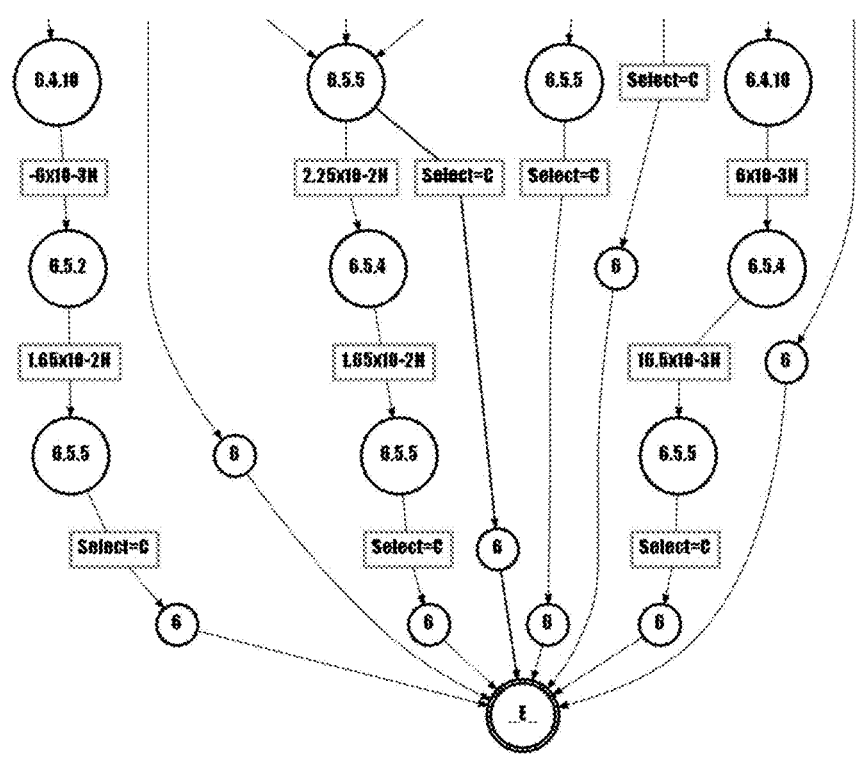
Figures 1, 10B:
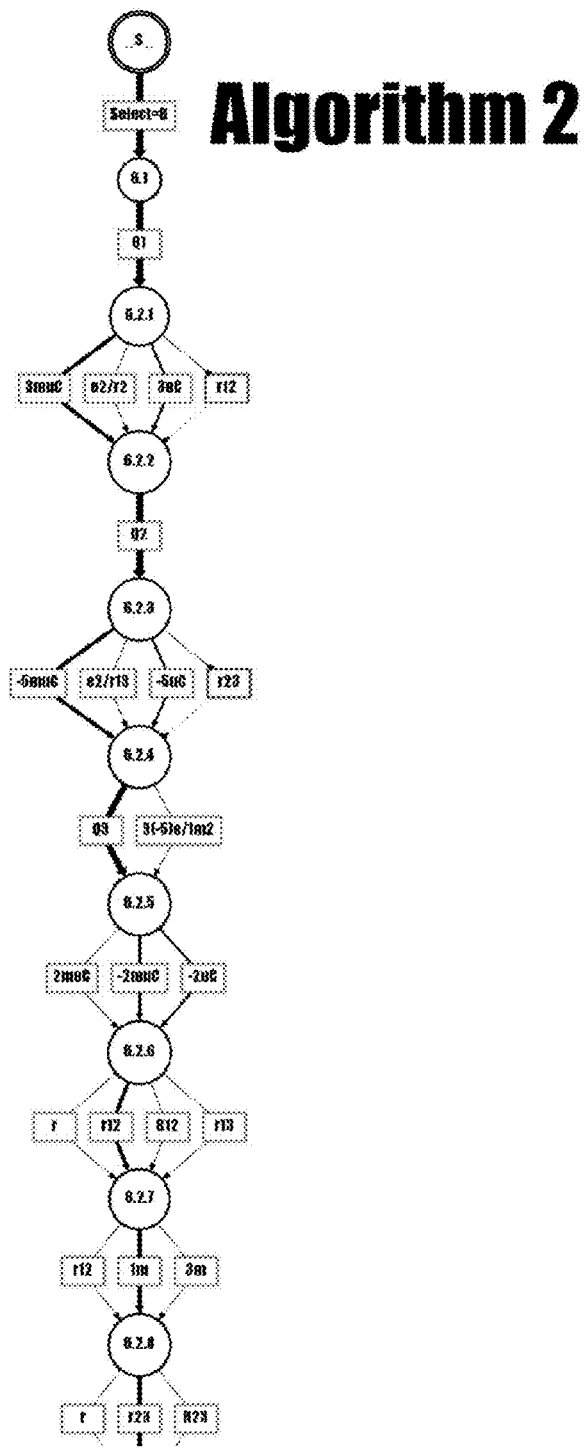
Figures 2, 10B:
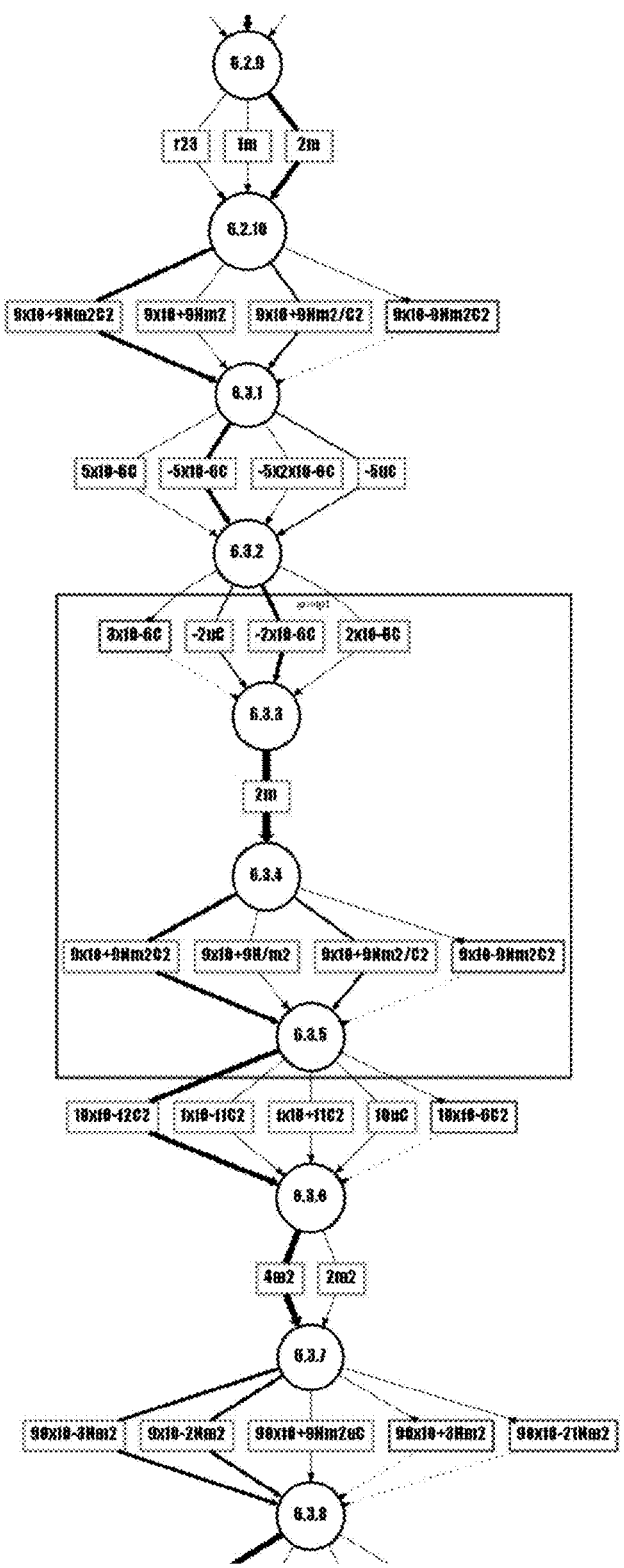
Figures 3, 10B:
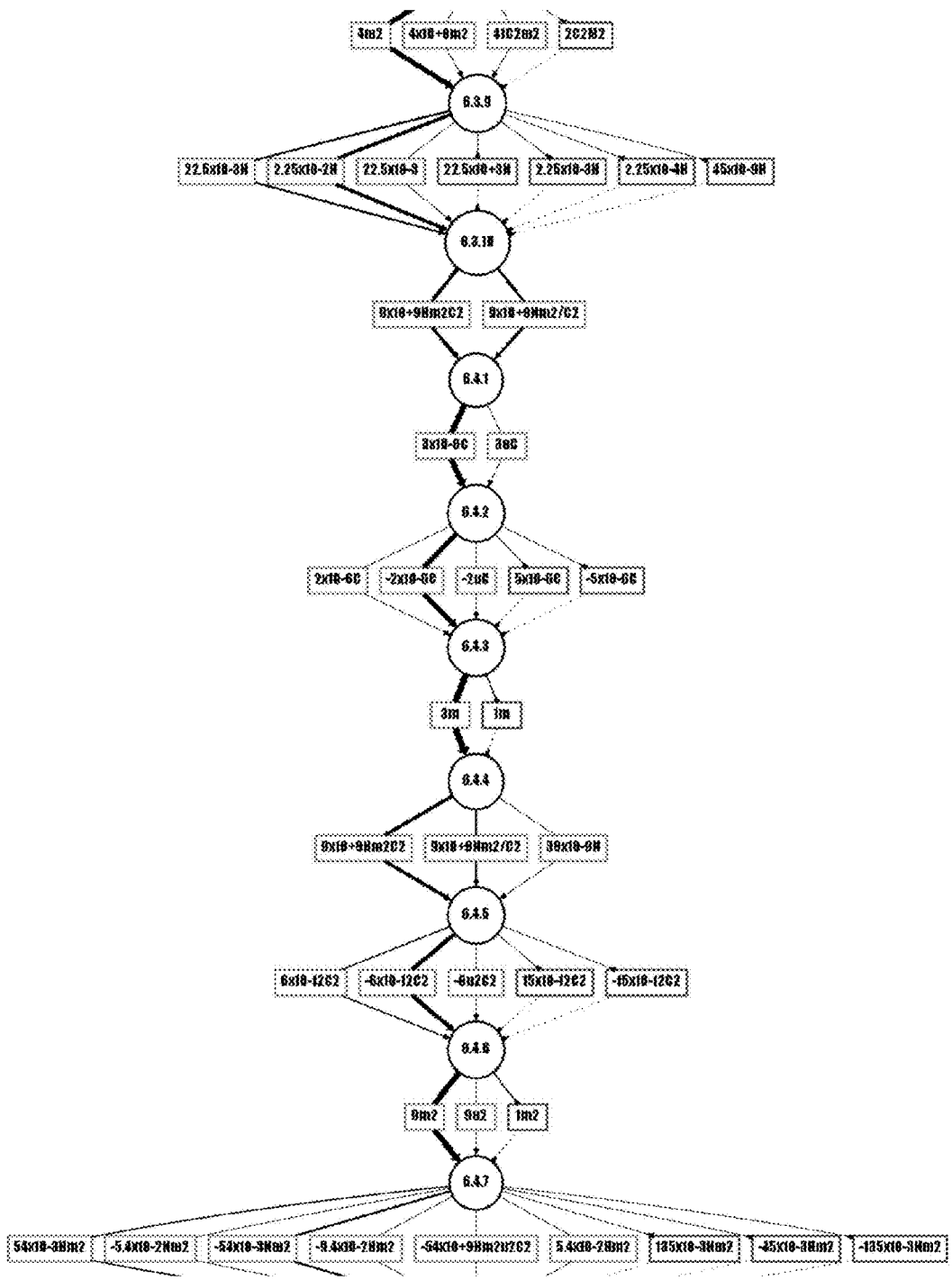
Figures 4, 10B:
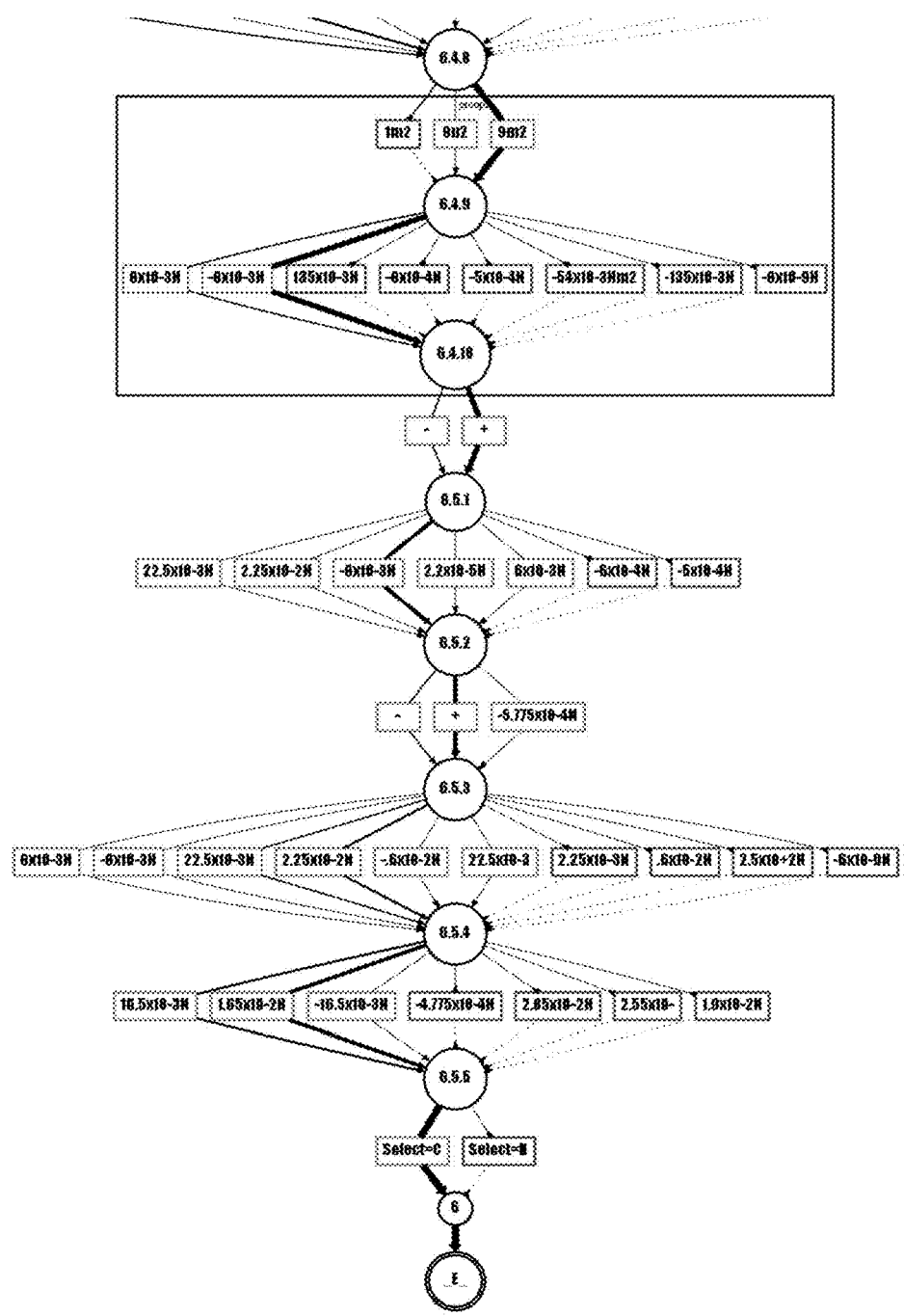
Figures 1, 10C:
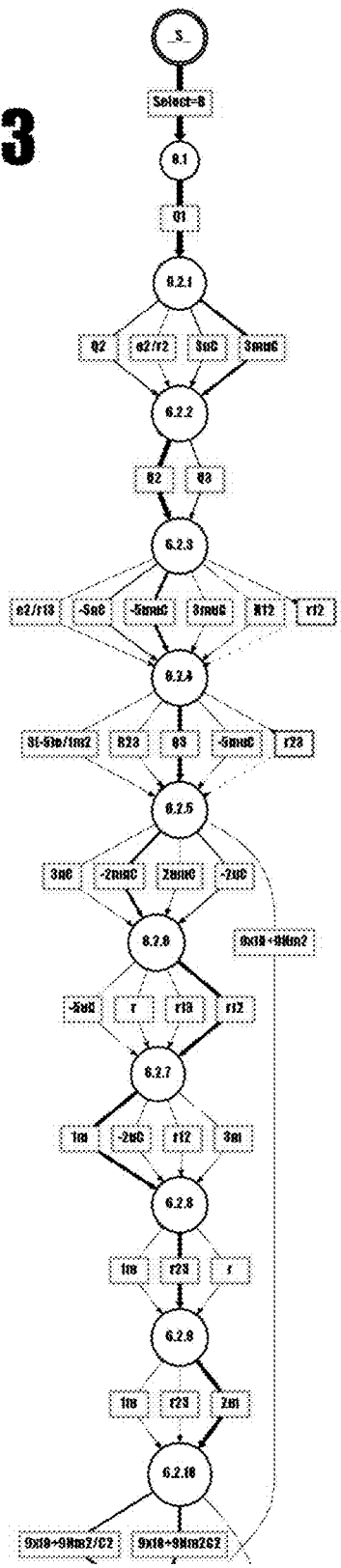
Figures 2, 10C:
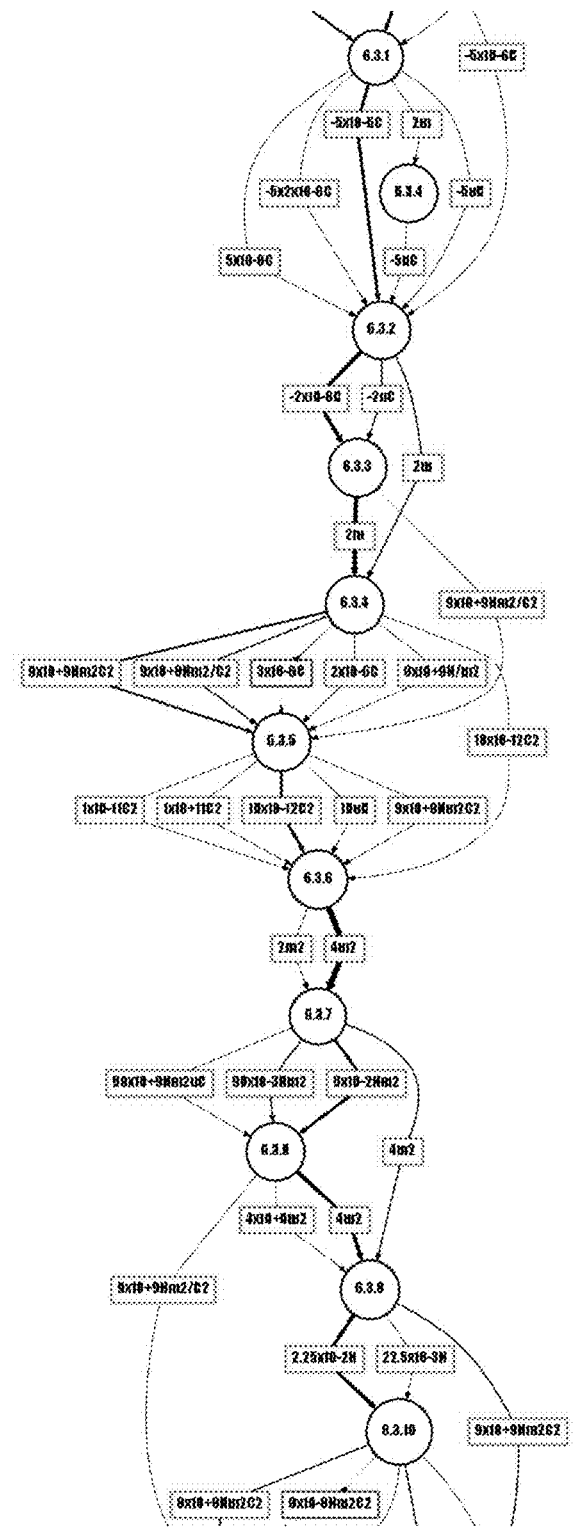
Figures 3, 10C:
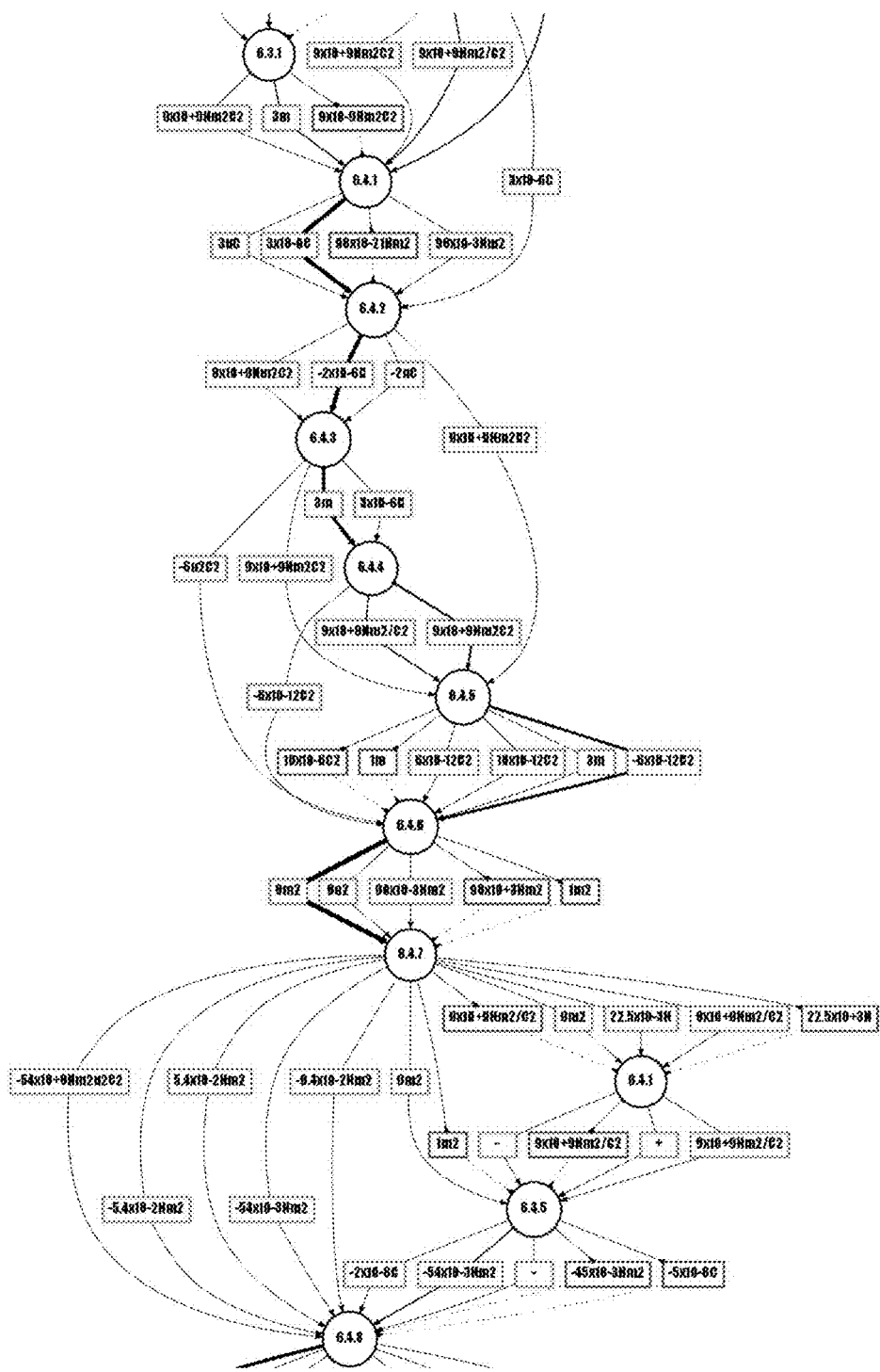
Figures 4, 10C:
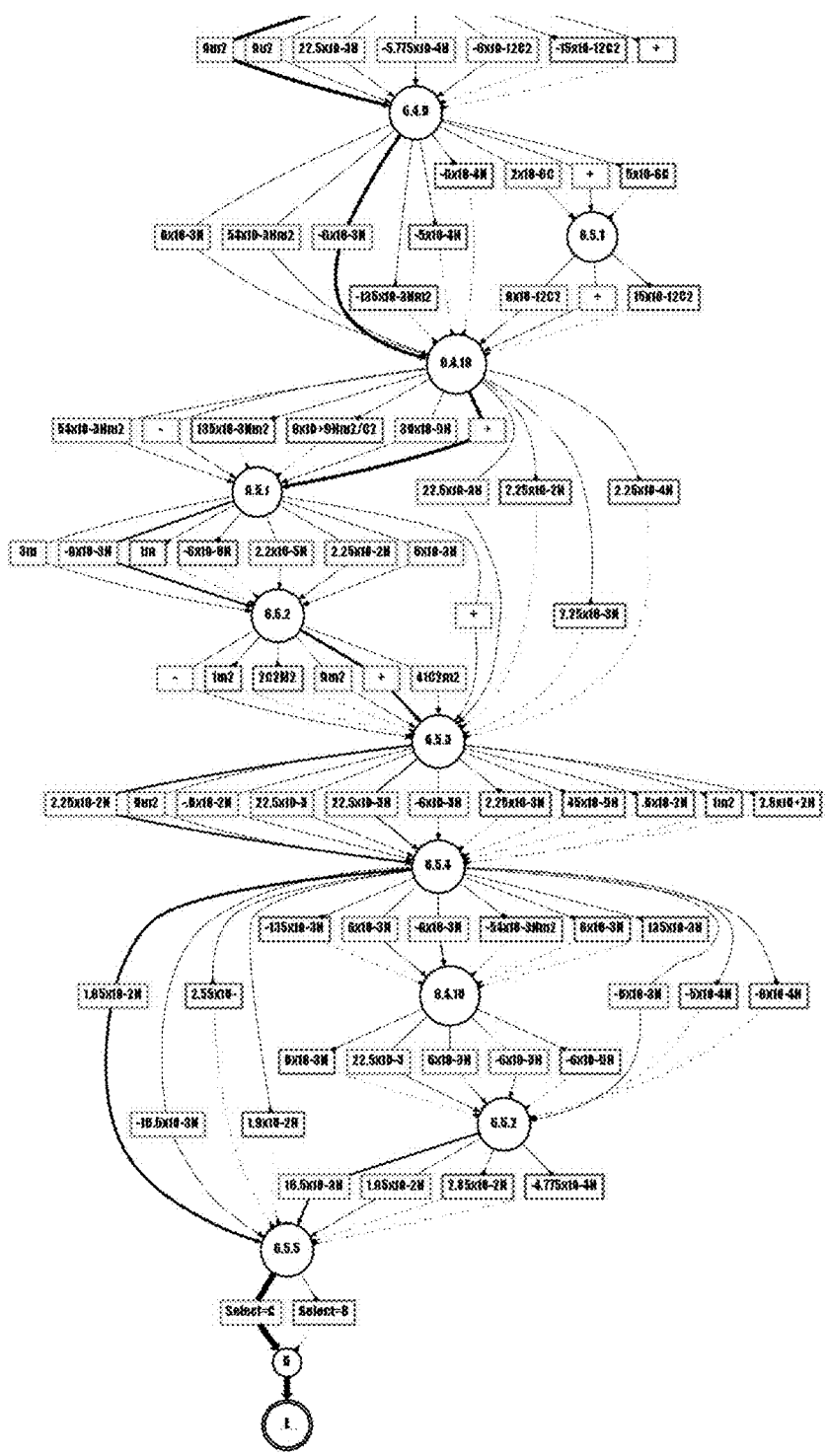
Figures 1, 10D:
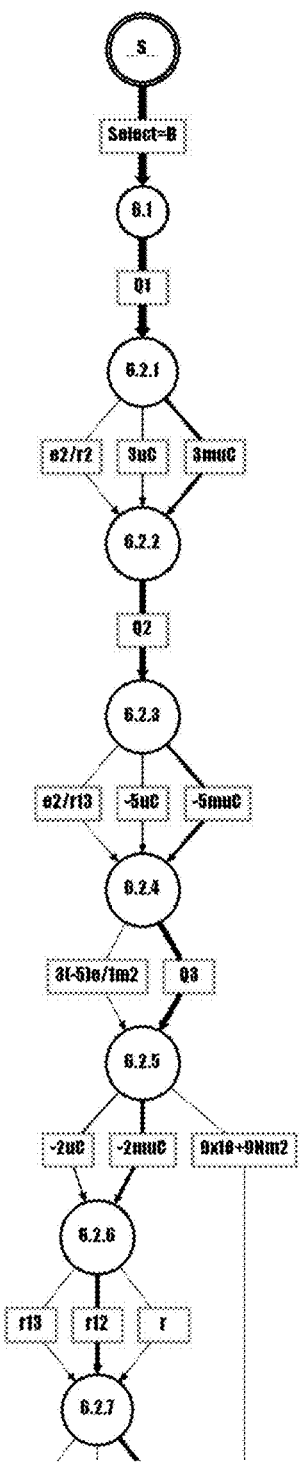
Figures 2, 10D:
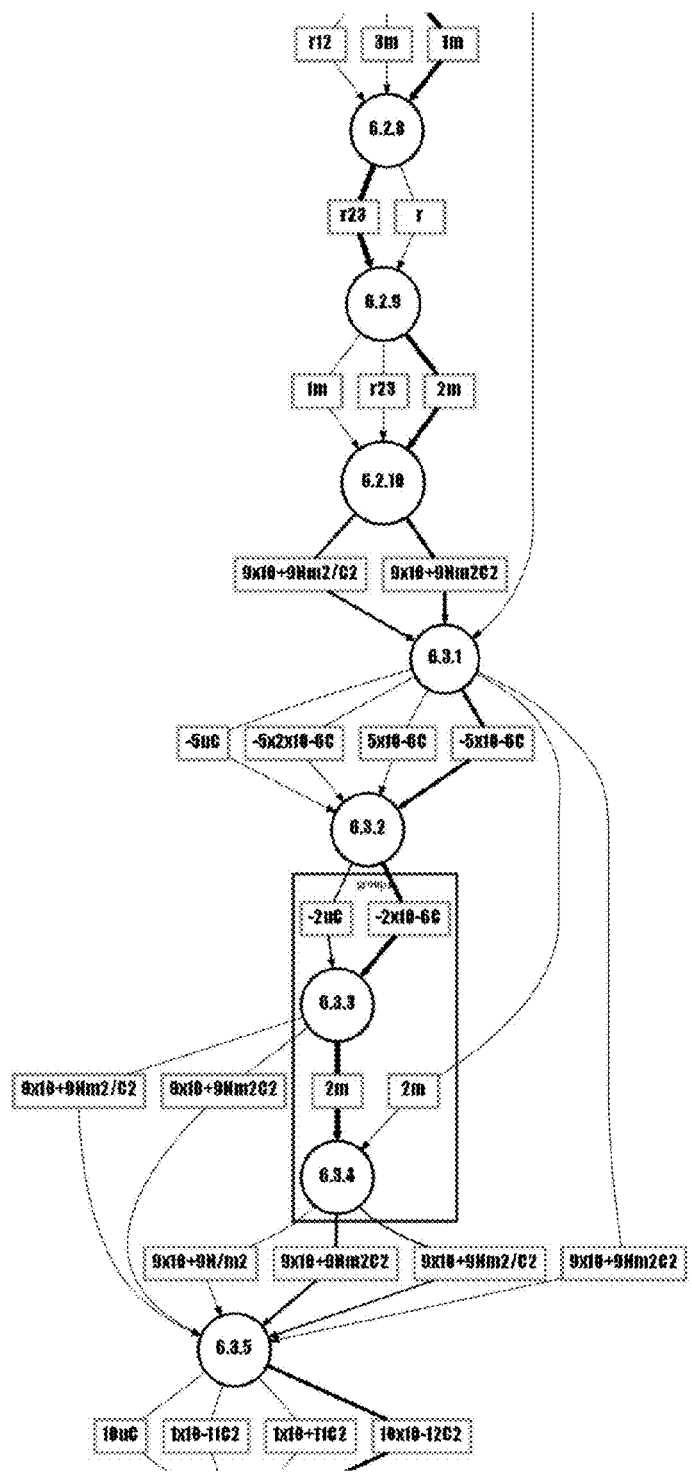
Figures 3, 10D:
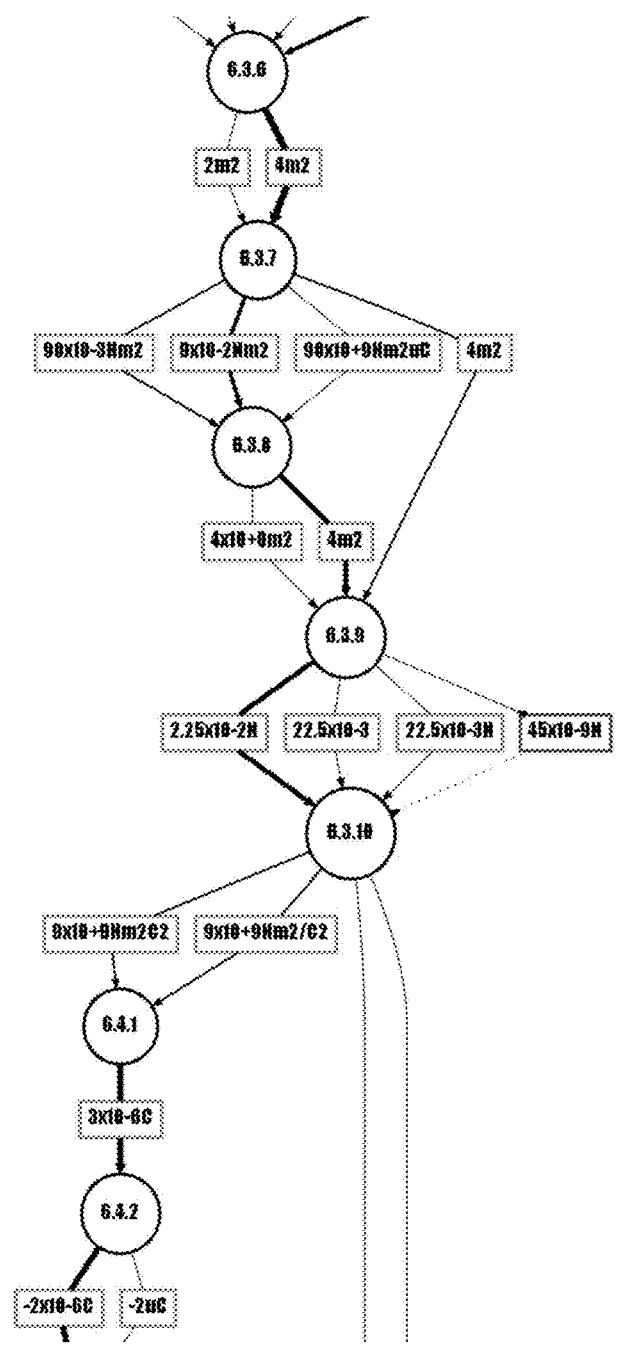
Figures 4, 10D:
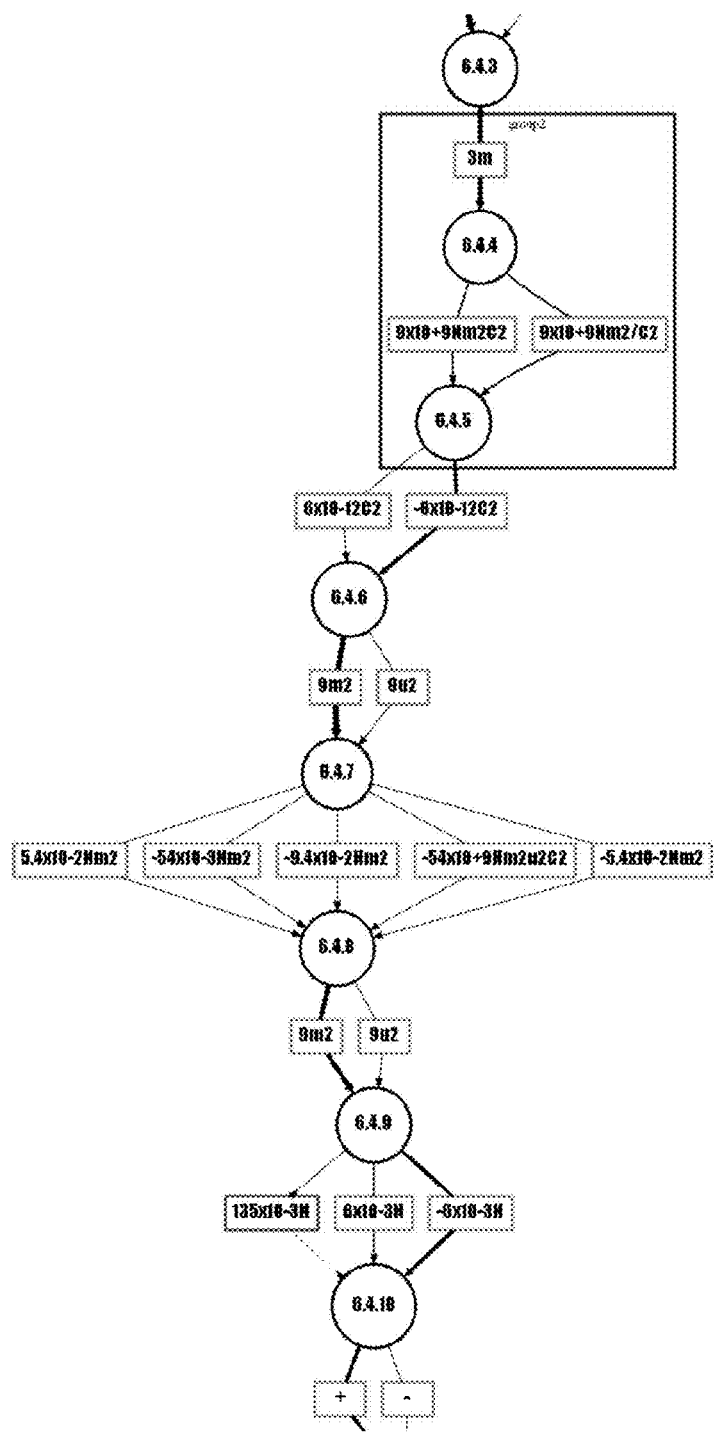
Figures 5, 10D:
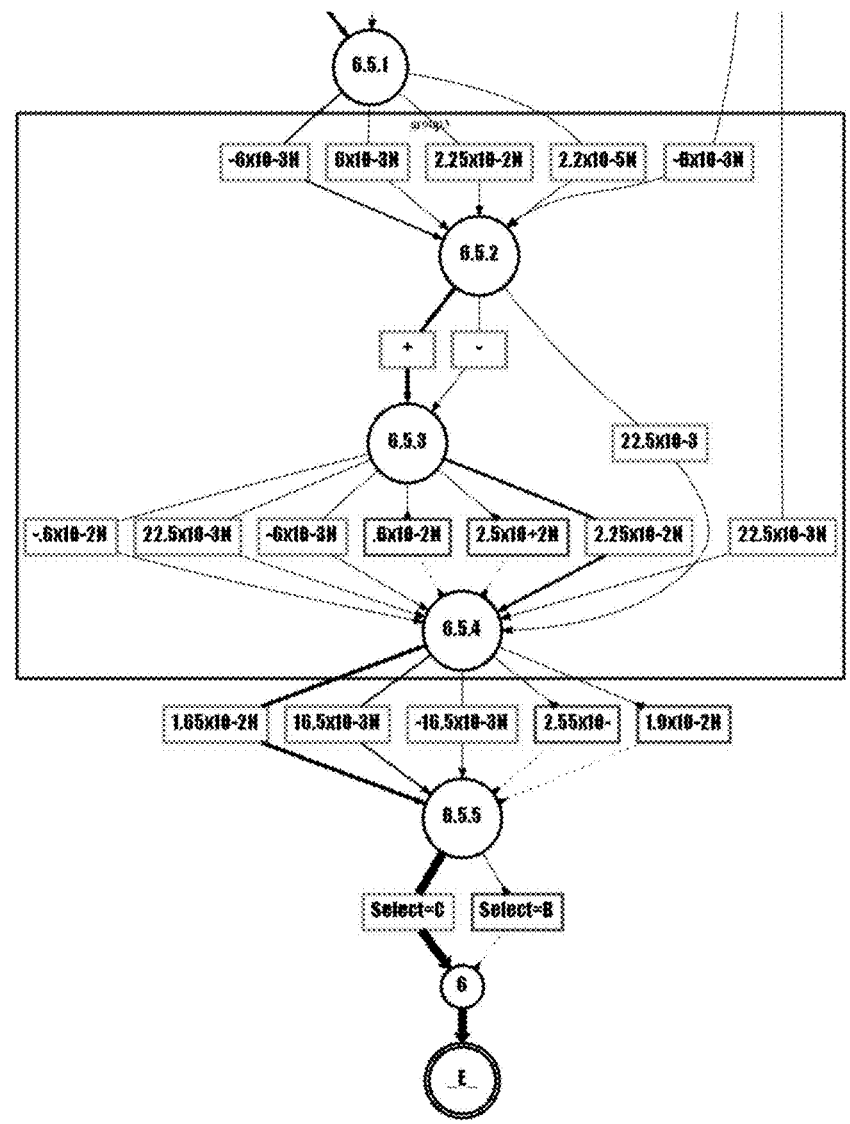

Before we present the algorithm for automatically generalizing behavior demonstration, we will describe the representation we use for capturing behavior demonstrations and visualize behavior graphs. Behavior demonstrations are captured as a sequence of user interface (UI) events. Each event is represented as a 2-tuple<element_id, data> that includes an identifier of the UI element and data associated with the event. FIG. 6a shows the UI of a step in a middle-school level fractions problem. It comprises of 5 active elements which are annotated with their identifiers. A hypothetical demonstration path through those elements is also annotated. FIG. 6b shows the events associated with that demonstration path. Note that the data field need not be limited to a single attribute. For example, in certain applications, event qualifiers such as type, duration, etc. may be included in the data. Beside the sequential nature of events in a behavior demonstration, events may have the same element identifier. Such events indicate a modification (e.g. a correction). We will refer to events that are succeeded by other events with the same identifier as retracted events. Note than unlike traces which are solution paths through an existing behavior graph, behavior demonstrations are not constrained to valid paths in the behavior graph. Because of this, behavior demonstrations by different users can be very different from each other in terms of the length of the sequence and the events they contain.

Behavior graphs are directed graphs. A manually constructed behavior graph corresponding to the above UI is shown FIG. 6c. The nodes in this graph (shown as circles) correspond to valid partial solution states. Edges in the graph represent behavior events some of which are correct and lead to the next state while other are incorrect and lead back to the same state. Correct edges are labeled using green boxes and incorrect edges are labeled using red boxes. Edges are also annotated with the data field of events and may be annotated with additional information such as element identifiers if necessary for readability. Besides a sequential organization of solution state, the behavior graph above showcases an alternate path between the states labeled 3=Done and 5=Done. Alternate paths are an important feature of behavior graphs especially for the use of ETTs in ill-defined learning domains. They support learner's exploration of alternate solutions to a problem.

In addition to nodes and edges, behavior graphs include unordered groups which indicate that states within a group may be traversed in any order. The states bound by the box are an example of an unordered group is shown in FIG. 6c. This unordered group indicates that the three UI elements corresponding to the mixed fraction may be filled in any order. Behavior graph authoring tools support a number of additional annotations on both the nodes and the edges. For example, incorrect edges may be annotated with corrective feedback provided to learners when their trace traverses that edge. Nodes are usually annotated with hints for tutoring applications and with skills for student modeling and assessment applications.

One of the key characteristics of Behavior Graphs that makes them a popular model is that they are readable by ITS authors without requiring a deep understanding of computational or cognitive sciences. Automatically created behavior graphs should be editable with existing authoring tools to facilitate manual annotation and modifications. Ideal generation algorithms should create concise graphs without losing other desirable characteristics. This may involve collapsing redundant paths and even pruning spurious or infrequent edges.

In order to minimize author effort, generated behaviors graphs should be as complete for creating an ETT as possible. As a minimal criterion, at least one valid path to the final solution should be included. Note that the creation of a complete graph (even manually) relies on the availability of one or more complete behavior demonstrations.

Behavior graphs should be error free. This includes being able to accurately capture the correct and incorrect events by learners depending on their current state.

One of the reasons for the success of good ETTs is the ability to use them with a wide range of learners under different deployment conditions. Automatically generated behavior graphs should retain this characteristic, e.g., by identifying alternate paths and unordered groups. A robust behavior graph need not necessarily be the most unconstrained graph, which maybe prone to gaming behaviors by learners. It is not unforeseeable that the use of a data-driven approach could contribute to creating behavior graphs that are more robust than those authored to a human expert.

Now we will describe a four-stage algorithm that combines multiple behavior demonstrations to automatically create a behavior graph. Several simplifying assumptions are made about the demonstrations which are explicitly noted to encourage the development of more robust algorithms.

We assume that all retracted events in a demonstration correspond to mistakes which were corrected by the user when the prior event is retracted. We process each available demonstration independently to combine the data from all retracted events into the last occurring event with the same element in each demonstration. The combined data values from the retracted events are considered as incorrect inputs for that element. This stage of the algorithm is similar to pre-reduction step used by Johnson et al.

We assume that there is one and only one path through the UI elements of the solution interface. This stage calculates the most frequently taken path through those elements to create a sequence of states for the automatically generated behavior graph. In the current implementation, we also assume that all demonstration end in a correct solution. For each unique UI element, collect events from all available demonstrations that were generated by the element under consideration. After stage 1, there should be at most one such event in each demonstration. As these events are collected, the positional index an event is found in each demonstration is preserved. Elements are sorted in an increasing order of the mode of their positional indices to obtain the sequence of states. Mean is used as a tie-breaker if elements have the same positional mode.

Given the sequence of states, we can generate a behavior graph by constructing edges between the states. For each unique correct data value an element takes in the demonstrations, we generate a correct edge between to the state corresponding to the element from the previous state. Similarly, for each incorrect data value (identified in Stage 1), an incorrect edge is generated at the previous state. The frequency of a data value is used to highlight each edge. This information can be used to prune a behavior graph for readability.

Two adjacent states are added to an unordered group if the corresponding UI elements frequently share each other's positional indices in the multiple demonstrations. Currently, we use a heuristic function ($\sqrt{\#demonstration}$) to determine the threshold frequency. Unordered groups between adjacent pairs of states are merged.

We conducted an experiment to collect behavior demonstrations for five Physics problems on the topic of Electrostatics. We recruited nine subjects to participate in the experiment. All subjects were adults who had completed a high school Physics course that covered topics in Electricity and Magnetism during their education. None of the subjects are educated in advanced Physics or are practicing Physicists in their professions. No refresher of the subject matter was provided prior to the experiment to elicit common mistakes from the subjects. They were allowed to use a scientific calculator and were provided data (Coulomb's constant, Charge of an electron) required to solve the problem. Each subject spent one hour on the experiment. During the one hour, a sequence of five problems was presented, one at a time. Each problem included a problem statement and a number of steps. FIG. 5 shows one of the problems used in our data collection. The data collection was completed over two days. All nine subjects were able to complete the first three problems (problem1, problem2, problem6) within an hour. Six subjects completed the fourth problem (problem10) and only four completed the fifth problem (problem15). Table 1 shows some statistics about the behavior demonstrations used in our experiment.

TABLE 1

| | # Demon- stration | #Demonstration Events | | | | | #UI Elements |
|---|---|---|---|---|---|---|---|
| | | Min. | Max. | Total | Avg. | St. Dev. | |
| problem1 | 9 | 5 | 8 | 49 | 5.44 | 0.96 | 5 |
| problem2 | 9 | 18 | 28 | 195 | 21.67 | 3.43 | 18 |
| problem6 | 9 | 35 | 52 | 377 | 41.89 | 6.08 | 37 |
| problem10 | 6 | 37 | 41 | 230 | 38.33 | 1.86 | 37 |
| problem15 | 4 | 54 | 58 | 223 | 55.75 | 1.48 | 55 |

Figure 7:
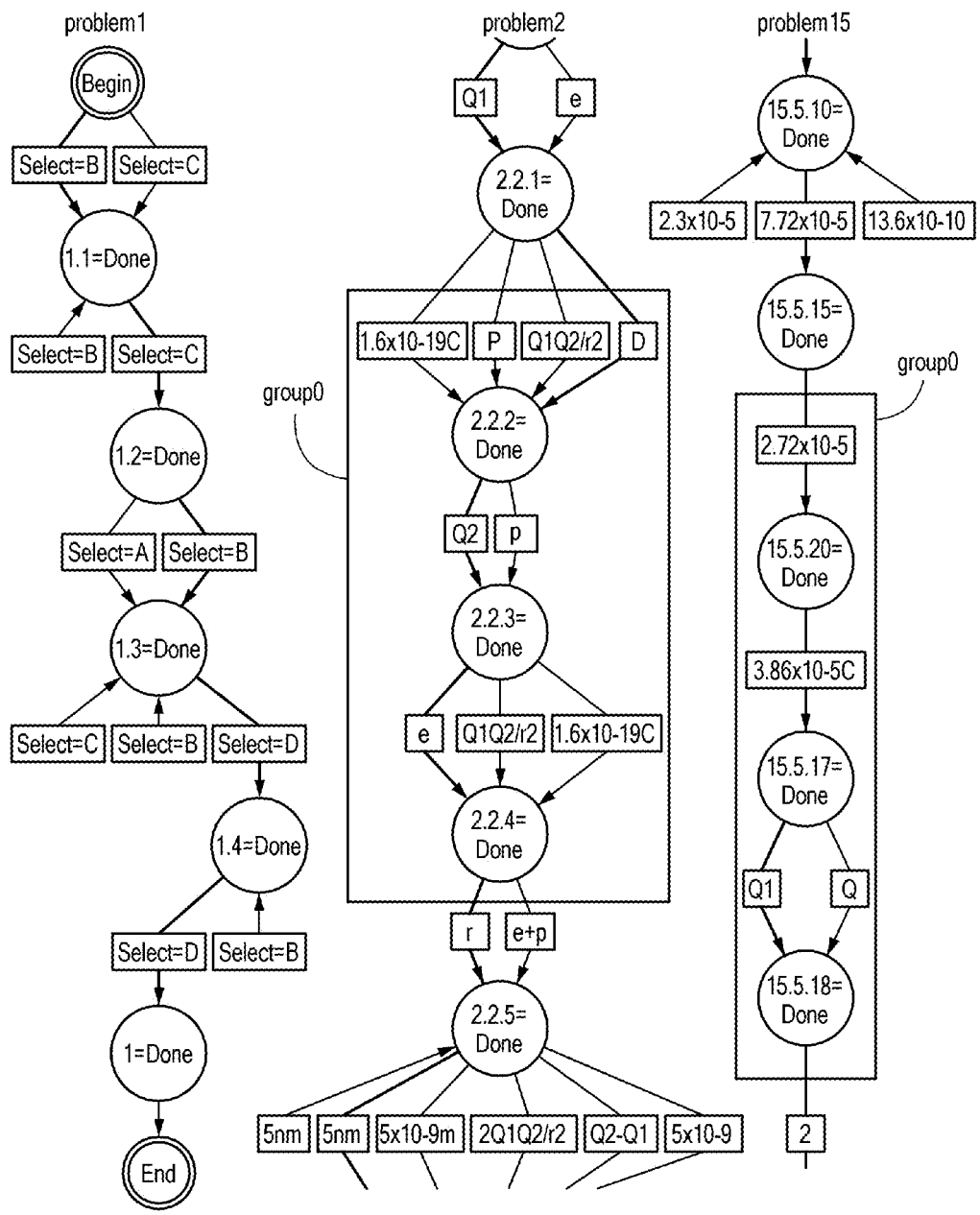
FIG. 7 is a diagram of examples of automatically generated behavior graphs.

The algorithm described above was applied to the set of behavior demonstrations available for each problem to automatically create a behavior graph for each problem. FIG. 7 shows the automatically created graphs for problem1, problem2 and problem15. Because of the large numbers of UI elements in problem2 and problem15, only part of their behavior graphs are shown. The automatically generated behavior graphs use the same representation as manually authored behavior graphs such as the one shown in FIG. 6c to allow further annotation of these graphs within our model building tools.

TABLE 2

| | # Nodes | Compr. Ratio | Correct Edges | | Incorrect Edges | | Error Rate | Branch. Factor | # Groups |
|---|---|---|---|---|---|---|---|---|---|
| | | | # | Accuracy | # | Accuracy | | | |
| problem 1 | 7 | 7.0 | 7 | 71.4 | 4 | 100.0 | 8.2 | 2.2 | 0 |
| problem 2 | 20 | 9.8 | 59 | 74.6 | 30 | 100.0 | 8.7 | 4.9 | 3 |
| problem 6 | 39 | 9.7 | 102 | 74.5 | 40 | 97.5 | 7.2 | 3.8 | 2 |
| problem 10 | 39 | 5.9 | 89 | 68.5 | 8 | 100.0 | 12.2 | 2.6 | 1 |
| problem 15 | 57 | 3.9 | 93 | 95.7 | 4 | 100.0 | 1.8 | 1.8 | 2 |
| Average | | 7.3 | | 76.7 | | 99.5 | 7.6 | 3.1 | |

As described above readable, complete, accurate and robust are desired qualities of the learning system. Compression Ratio measures the rate at which demonstration events are reduced into behavior states (i.e. nodes). A trivial algorithm that generates a full interaction network from the available demonstrations will have a compression ratio of 1.0. Our algorithm achieves an average compression ratio of 6.63. Problems with more demonstrations are able to achieve higher compression because our algorithm combines identical events during Stage 3 and 4. The minimal criterion for completeness is guaranteed by the assumptions made at Stage 2 of our algorithm. Once we further operationalize our authoring tools, we would like to measure additional authoring effort required annotate and modify automatically generated graphs as a measure of completeness. Edge accuracy measures the percentage of Correct and Incorrect edges that were accurately classified by the algorithm. Error rate is a frequency weighted combination of edge accuracy that measures the fraction of learner events that will be inaccurately classified by the automatically generated behavior graph. We believe this should be the primary metric for evaluating automatic behavior graph generation. As we see from Table 2, both our accuracy metrics have scope for significant improvement Note that the trivial algorithm that generates an interaction network would achieve an error rate of 0 percent on the demonstrations used to build the network. Branching factor is the average number of data values available at each UI element. A large branching factor indicates the capability to process a large variety of learner inputs at each state. Average number of retracts, a related metric, measures the average number of retracted events identified during Stage 2 of our algorithm. Heldout demonstrations can also be used to measure the robustness towards unseen user inputs. Finally, a larger number of unordered groups is indicative of flexibility a graph affords to learners to explore the solution paths of a problem.

Figure 8:
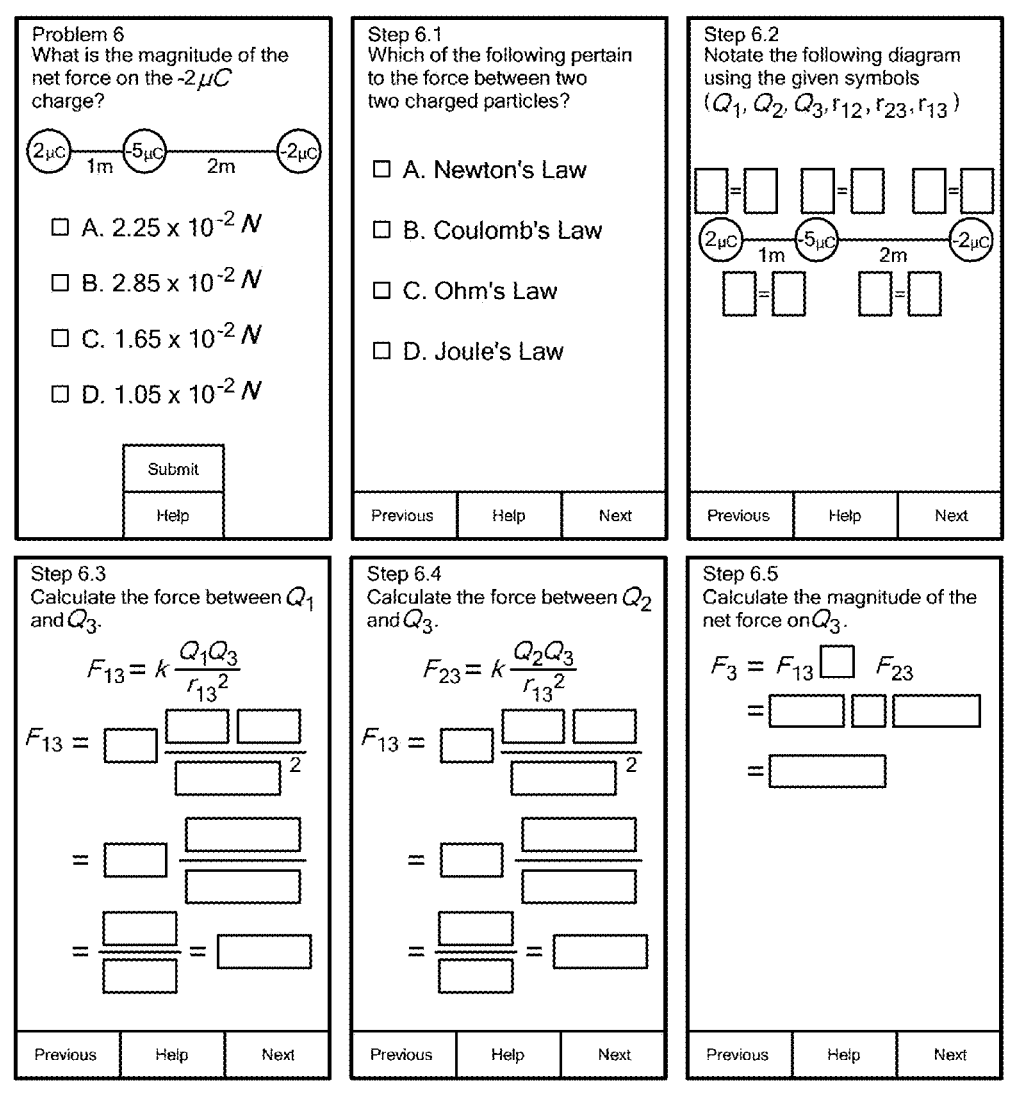

Behavior demonstrations are captured as a sequence of user interface (UI) events. The UI for another example problem is shown in FIG. 8. Each event is represented as a 2-tuple $e_i = (u_i, d_i)$ that includes an identifier $u_i$ of the UI element and data $d_i$ associated with the event. A UI element may be visited any number of times in a demonstration. The data includes one or more attributes of the event such as the event type, user input, event duration, etc. In this disclosure, we will use single data attribute events where the data captures the learner input value.

Behavior graphs are directed graphs. The nodes in this graph correspond to valid solution states. Non-terminal nodes represent partial solutions. Edges in the graph represent events some of which are correct and lead to the next state while other are incorrect and lead back to the same state. Edges are annotated with the conditions that an event must meet to traverse the edge. Behavior graphs may contain multiple paths between two nodes. Multiple paths are useful to facilitate learner's exploration of alternate solutions to a problem especially in ill-defined learning domains.

Figure 9:
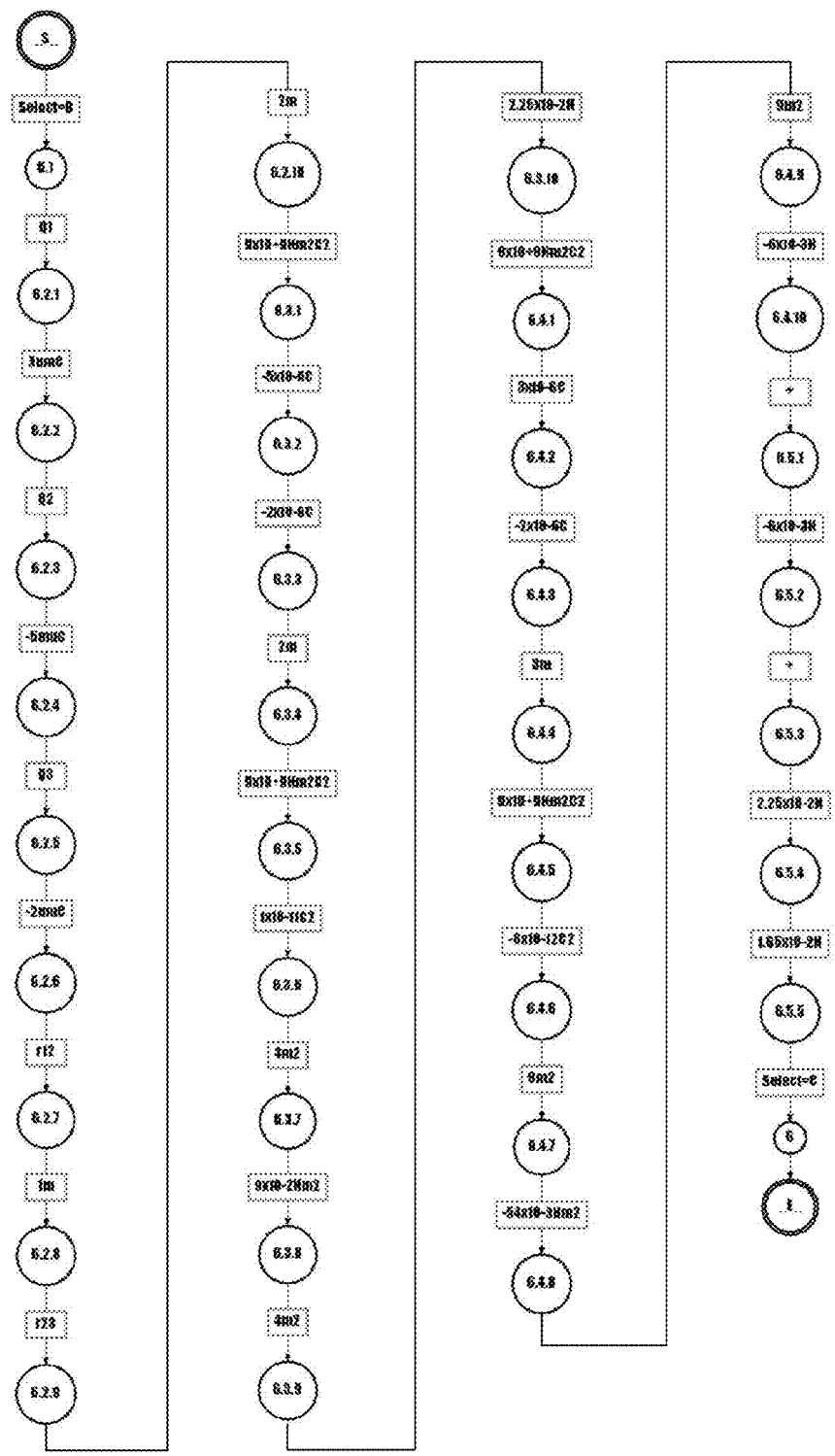
FIG. 9 is a diagram of a graph.

Behavior graphs may also include unordered groups. As the name suggests, states within an unordered group may be traversed in any order. Furthermore, constituents (i.e. nodes, edges, groups) of the behavior graph may be associated with a number of additional annotations based on the educational application. Each behavior demonstration implicitly represents a behavior graph where the nodes in the graph correspond to the state of completion of each event in the demonstration. For example, the behavior graph of a demonstration for the example problem is shown in FIG. 9. Such a behavior graph does not generalize to learner behaviors beyond those that are exactly identical to the demonstration.

ABGG algorithms utilize multiple behavior demonstrations to generate a generalized behavior graph.

The first algorithm to be discussed combines the individual behavior graph corresponding to each available demonstration by merging identical nodes and edges in a sequential order. When a non-identical edge is found, a new branch is created in the graph. The resulting behavior graph is an interaction network. FIG. 10 shows an example of an interaction network. All paths in the behavior graph generated by this algorithm are assumed to be correct paths i.e. this algorithm is incapable distinguishing between correct and incorrect actions by the learner. While the behavior graph generated by this algorithm is more general than any individual demonstration used to create the graph, no unseen paths are generated. Furthermore, the number of nodes and edges created by this algorithm is fairly large, which makes the annotation of such graphs difficult for problems with many UI elements. Because of its simplicity and prior use, we will use this algorithm as a baseline in our experiments.

Our next algorithm utilizes two characteristics of behavior demonstrations. If two or more events in a demonstration have the same element identifier $u_j$, the latter event likely corresponds to a correction of the data value input at the former events. In this case, we refer to the former events as retracted events and data values entered at these events can be assumed to be incorrect values. The second characteristic of behavior demonstrations is that the element identifiers form a small finite set. If we assume that there is one and only one correct solution sequence through the UI elements, we can transform the problem of generalizing behavior demonstrations to that of finding the optimal sequence of states through the UI elements. Our second algorithm, shown in Table 3, utilizes these two assumptions to generate a behavior graph in four stages. The threshold for deciding group membership is a heuristically determined hyper parameter. Higher threshold values lead to fewer and smaller unordered groups. Authoring tools that employ this algorithm may allow authors to choose the threshold.

TABLE 3

Stage 1. Compute Retracted Demonstrations
    For each demonstration D
        For each retracted event e = (u, d)
            1.   $e_{target}$ = last event in D s.t. $e_{target}$ →u = e→u
            2.   Add e→d to $e_{target} \cdot d_{wrong}$
            3.   Remove e from D
Stage 2. Find Sequence of States
    For each unique identifier u
        1.   $p_u$ = set of positional indices of events s.t. identifier = u
        2.   $mode_u$ = mode($p_u$)
        Squences states ($s_u$) corresponding to each element identifier (u) in increasing order of their $mode_u$
Stage 3. Generate Edges
    For each state $s_u$*
        1.   Generate correct edge for each unique d for events s.t. identifier = u*
        2.   Generate wrong edge for each unique entry in $d_{wrong}$ for events s.t. identifier = u*
Stage 4. Identify Unordered Groups
    For each pair of adjacent state ($s_{u1} \cdot s_{u2}$)
        1.   if $|\cap(p_{u1}, p_{u2})| > \sqrt{|demonstrations|}$, group $s_{u1}, s_{u2}$ Note that Stage 2 of the previous algorithm is, in effect, aligning the multiple demonstrations by using a heuristic reorganization of the events that converges the positional indices of events with the same element identifier to the mode of their original indices. The problem of aligning multiple sequences of symbols is of wide interest in other fields of computer science specifically in the field of bioinformatics. The Center Star Algorithm is a commonly used algorithm in this field that makes no assumptions about the size and contents of the symbol set. In algorithm 3, after computing the retracted demonstrations using the same method as algorithm 2, we use the Center Star algorithm to align the events across each retracted demonstration using the element identifier of those events as the symbols. We use a very large substitution penalty in the pairwise alignments to prevent any substitutions in the alignments obtained. This leads to only elements with the same element identifier to be aligned with each other.

Similar to algorithm 2, a new state is generated for each position in the aligned demonstrations. However, since we obtain the alignment using the Center Star algorithm, the second assumption made by algorithm 2 is not necessary, which can lead to multiple states with the same element identifiers. This allows algorithm 3 to generate alternate paths. The edges between states are generated using the same procedure as algorithm 2.

We can obtain a first order transition matrix from the available demonstrations where each cell captures the frequency of transition between two UI elements. Such a transition matrix represents a directed graph, which may contain cycles. For the last algorithm presented in this disclosure, we consider ABGG as the process of finding multiple paths in a directed graph. This problem has been extensively studied in computer science. Specifically, the longest (non-repeating) path in this directed graph represents the most likely path through the UI elements based on the demonstrations. The problem of finding longest paths in general graphs is known to be NP-hard. In our approach, we employ an exponential time longest path finding algorithm within bounds of number of UI elements and use a transformed transition matrix to find multiple shortest paths. The transform changes the weight of each valid edge of the directed graph to row normalized inverse. We merge all the paths found to construct a behavior graph similar to the process of constructing an interaction network.

Similar to ABGG algorithms 2 and 3, this algorithm is applied on the retracted demonstrations to allow identification of correct and incorrect inputs. Also, similar to algorithm 2, two states are added to an unordered group if there are frequent transitions between the two states in the demonstrations.

FIGS. 10a-10d show examples of automatically generated behavior graphs using the four algorithms presented earlier. We use the following visual convention: Circular nodes represent states and are labeled with identifiers of the corresponding UI element. Edges are labeled with the data values. Correct edges are labeled with green rectangles and incorrect edges are labeled with red rectangles. Unordered groups are shown using blue containers. All four graphs in FIGS. 10a-10d were generated using nine demonstrations for the problem shown in FIG. 8.

TABLE 4

| Capability | Algorithm | | | |
| --- | --- | --- | --- | --- |
| | 1 | 2 | 3 | 4 |
| Identifies incorrect answers | N | Y | Y | Y |
| Generates alternate paths | N | N | Y | Y |
| Finds unordered groups | N | Y | N | Y |
| Generalizes beyond training demonstrations | N | Y | Y | Y |
| Guarantees all training demnstrs. will pass | Y | N | N | N |
| Finds atleast one path to final solution* | Y | Y | Y | N |
| Discovers new/unseen data values | N | N | N | N |

Table 4 characterizes the four algorithms based on their capabilities. As mentioned earlier, incremental addition of demonstrations to generate interaction networks does not identify incorrect input data values. Under the assumption about retracted events, the other three algorithms are able to identify incorrect inputs. Johnson et al. used a similar assumption in their work on reducing the visual complexity of interaction networks. We notice that the algorithms 2 and 3 are complementary in terms of their ability to find alternate paths and unordered groups. Algorithm 4 on the other hand offers both of these abilities.

We use two collections of behavior demonstrations/traces to evaluate the performance of the algorithms described in this disclosure. The first dataset (referred to as the BBN dataset) comprises five problems. A pilot data collection was conducted to collect behavior demonstrations for Physics problems on the topic of Electrostatics. We recruited nine subjects to participate in the experiment. Each subject spent one hour on the experiment during which a sequence of five problems was presented, one at a time. Each problem included a problem statement and a number of steps. FIG. 8 shows one of the problems used in our data collection. The data collection was completed over two days. All nine subjects were able to complete the first three problems (problem1, problem2, problem6) within an hour. Six subjects completed the fourth problem (problem10) and only four completed the fifth problem (problem15). Table 5 shows statistics about the behavior demonstrations in the BBN dataset.

TABLE 5

|  | #Demon-strations | Average #Events | #UI Elements |
|---|---|---|---|
| problem1 | 9 | 5.44 | 5 |
| problem2 | 9 | 21.67 | 18 |
| problem6 | 9 | 41.89 | 37 |
| problem10 | 6 | 38.33 | 37 |
| problem15 | 4 | 55.75 | 55 |

In addition, we used three Assistments datasets accessed via DataShop to form our second collection of behavior demonstrations for a different STEM learning domain. This publicly shared large dataset comprises a total of 683197 traces and 1905672 events for 3140 problems. For our experiments, we treat the three datasets to be independent of each other to account for change in UI designs of the problems common to the three datasets. We further filtered these datasets to use only problems that had six or more traces and had at least two UI elements. Also, we eliminated all events, such as help requests, that did not correspond to user input at a UI element. As a result of this filtering, we were left with 1014 problems which form the Assistments dataset. Table 6 shows statistics about this dataset.

TABLE 6

|  | Min. | Max. | Average | Median |
|---|---|---|---|---|
| #Traces | 6 | 1177 | 113.9 | 52 |
| #EventsPerTrace | 2 | 129 | 5.5 | 5 |
| #UI Elements | 2 | 32 | 4.7 | 4 |

Note than unlike the BBN dataset which is comprised of unconstrained demonstrations, the Assistments dataset is comprised of traces. Traces are solution paths through an existing behavior graph. Because of this, behavior demonstrations by different users can be very different from each other in terms of the length and the sequence of events they contain. However, well designed existing behavior graphs usually allow arbitrary incorrect inputs from the learner at every UI element which allows some variation in behavior traces. Despite this shortcoming, we included the Assistments dataset for evaluation purposes because of its volume, which enables us to conduct cross validation style experiments. Also, we can note that the problems in the Assistments dataset are relatively simple, as indicated by the small median of number of UI elements. In this way, the two datasets complement one another in terms of comparing an algorithm's performance for complex problems vs. many demonstrations/traces.

Before we discuss our experiments with the two datasets described above, we will discuss the metrics used in our evaluation and the desirable characteristics of behavior graphs that motivate these metrics. Since the purpose of the behavior graphs is to serve as a tutor model, the primary metric for evaluating these models is their learning efficacy measured via use of the models by a relevant sample of learners. One of the key characteristics of behavior graphs that makes them a popular model is that they are readable by ITS authors without requiring a deep understanding of computational or cognitive sciences. Automatically created behavior graphs should be editable with existing authoring tools to facilitate necessary manual annotation and modifications. Ideally. ABGG algorithms should create concise graphs without losing other desirable characteristics. This may involve collapsing redundant paths and even pruning spurious or infrequent edges. The conciseness of a graph can be measured using the number of nodes and edges in the graph. We also use compression ratio to measure the rate at which an algorithm is able to reduce demonstration events into behavior states (i.e. nodes) by finding similarities between events.

In order to minimize author effort, generated behaviors graphs should be as complete for creating an ETI as possible. As a minimal criterion, at least one valid path to the final solution should be included-. Note that the creation of a complete graph (even manually) relies on the availability of one or more complete behavior demonstrations. As long as this condition is met, algorithms 1, 2 and 3 are guaranteed to meet this minimal criterion. Additionally, we use the rate of unseen events in held out demonstrations as a metric to measure the completeness of our automatically generated behavior graphs.

Behavior graphs should be error free. This includes being able to accurately capture the correct and incorrect events by learners depending on their current state. Edge accuracy measures the percentage of Correct and Incorrect edges that were accurately classified by the algorithm. Error rate is a frequency weighted combination of edge accuracy that measures the fraction of learner events that will be inaccurately classified by the automatically generated behavior graph. We use this as the primary metric for evaluating automatic behavior graph generation. Annotations for edge accuracies were manually done for the BBN dataset over three iterations by two different annotators. For the Assistments dataset, the annotations were based on the classification of user input provided in the original dataset.

One of the reasons for the success of expertly crafted ETTs is the ability to use them with a wide range of learners under different deployment conditions. Automatically generated behavior graphs should retain this characteristic; e.g., by identifying alternate paths and unordered groups. A robust behavior graph need not necessarily be the most unconstrained graph, which may be prone to gaining behaviors by learners. It is not unforeseeable that the use of a data-driven approach could contribute to creating behavior graphs that are more robust than those authored by a human expert. Branching factor is the average number of data values available at each UI element. A large branching factor indicates the capability to process a large variety of learner inputs at each state. Also, the number of unordered groups and the size of unordered groups are indicative of flexibility a graph affords to learners to explore the solution paths of a problem. Note that readability and robustness are compleindicate the performance of an algorithm due to over-fitting. We use two different experimental designs for the two datasets. Since the BBN dataset is comprised of a small number of demonstrations per problem, we use all available demonstrations for training and report only the metrics that can be derived from the graphs and using the training sequences. Since a large number of traces are available for the problems in the Assistments dataset, we use a three-fold cross validation design to split the available traces into three different training and held out sets. Reported metrics are averaged over each split.

TABLE 7

| | Rendability | | | | | | | | | | | | | | | |
|---|---|---|---|---|---|---|---|---|---|---|---|---|---|---|---|---|
| | #Nodes | | | | #Correct Edges | | | | #Incorrect Edges | | | | Compression Ratio | | | |
| | | | | | | Algorithm | | | | | | | | | | |
| | 1 | 2 | 3 | 4 | 1 | 2 | 3 | 4 | 1 | 2 | 3 | 4 | 1 | 2 | 3 | 4 |
| problem 1 | 16 | 7 | 7 | 7 | 19 | 7 | 9 | 10 | | 4 | 4 | 2 | 3.1 | 7.0 | 7.0 | 7.0 |
| problem 2 | 127 | 20 | 26 | 20 | 149 | 59 | 90 | 57 | | 30 | 33 | 10 | 1.5 | 9.8 | 7.5 | 9.8 |
| problem 6 | 230 | 39 | 46 | 39 | 261 | 102 | 158 | 96 | | 40 | 50 | 7 | 1.6 | 9.7 | 8.2 | 9.7 |
| problem 10 | 204 | 39 | 43 | 39 | 205 | 89 | 113 | 92 | | 8 | 8 | 5 | 1.1 | 5.9 | 5.3 | 5.9 |
| problem 15 | 147 | 57 | 63 | 57 | 168 | 93 | 115 | 102 | | 4 | 4 | 1 | 1.5 | 3.9 | 3.5 | 3.9 |
| Average | 144.8 | 32.4 | 37.0 | 32.4 | 160.4 | 70.0 | 97.0 | 71.4 | | 17.2 | 19.8 | 5.0 | 1.8 | 7.3 | 6.3 | 7.3 |

| | Accuracy | | | | | | | | | | | | Completeness | | | |
|---|---|---|---|---|---|---|---|---|---|---|---|---|---|---|---|---|
| | % Correct Edges | | | | % Incorrect Edges | | | | Training Error Rate | | | | % Training Unseen Events | | | |
| | | | | | | Algorithm | | | | | | | | | | |
| | 1 | 2 | 3 | 4 | 1 | 2 | 3 | 4 | 1 | 2 | 3 | 4 | 1 | 2 | 3 | 4 |
| problem 1 | 63.2 | 71.4 | 55.6 | 80.0 | 100.0 | 75.0 | 100.0 | 16.3 | 8.2 | 24.5 | | 8.2 | 0.0 | 0.0 | 0.0 | 4.1 |
| problem 2 | 68.4 | 74.6 | 66.7 | 82.4 | 100.0 | 75.8 | 100.0 | 24.1 | 8.7 | 14.9 | | 9.2 | 0.0 | 0.0 | 3.9 | 4.3 |
| problem 6 | 73.9 | 74.5 | 60.8 | 78.1 | 97.5 | 36.0 | 100.0 | 18.0 | 7.2 | 11.7 | | 8.2 | 0.0 | 0.0 | 1.8 | 2.7 |
| problem 10 | 82.4 | 68.5 | 58.4 | 76.1 | 100.0 | 62.5 | 100.0 | 15.7 | 12.2 | 12.2 | | 10.0 | 0.0 | 0.0 | 6.7 | 15.9 |
| problem 15 | 95.2 | 95.7 | 89.6 | 97.1 | 100.0 | 50.0 | 100.0 | 3.6 | 1.8 | 1.8 | | 2.2 | 0.0 | 0.0 | 9.5 | 13.3 |
| Average | 76.7 | 77.0 | 66.2 | 82.8 | 99.5 | 59.9 | 100.0 | 15.5 | 7.6 | 13.0 | | 7.6 | 0.0 | 0.0 | 4.4 | 8.1 |

| | Robustness | | | | | | | | | | | | | | | |
|---|---|---|---|---|---|---|---|---|---|---|---|---|---|---|---|---|
| | Branching Factor | | | | #Groups | | | | Avg. Group Size | | | | % Group Coverage | | | |
| | | | | | | Algorithm | | | | | | | | | | |
| | 1 | 2 | 3 | 4 | 1 | 2 | 3 | 4 | 1 | 2 | 3 | 4 | 1 | 2 | 3 | 4 |
| problem 1 | 1.4 | 2.2 | 2.6 | 2.4 | | 0 | 1 | | | | | 3.0 | | 0 | | 42.9 |
| problem 2 | 1.2 | 4.9 | 5.1 | 3.7 | | 3 | 3 | | | 3.7 | | 4.7 | | 55.0 | | 70.0 |
| problem 6 | 1.1 | 3.8 | 4.7 | 2.8 | | 2 | 3 | | | 2.5 | | 2.3 | | 12.8 | | 17.9 |
| problem 10 | 1.0 | 2.6 | 3.0 | 2.6 | | 1 | 3 | | | 4 | | 2.0 | | 10.3 | | 15.4 |
| problem 15 | 1.2 | 1.8 | 2.0 | 1.9 | | 2 | 3 | | | 3 | | 2.0 | | 10.5 | | 10.5 |
| Average | 1.2 | 3.1 | 3.4 | 2.7 | | 1.6 | 2.6 | | | 3.3 | | 2.8 | | 17.7 | | 31.3 | mentary characteristics of a behavior graph. For example, a highly complex behavior graph may be very robust but may not be very readable.

The readability metrics (i.e. number of nodes, number of edges and compression ratio) as well as the robustness metrics (branching factor, number of unordered groups, average group size and coverage of graph within groups) are reported on the behavior graphs generated by the algorithms. On the other hand, some accuracy metrics such as the accuracy of correct and incorrect edges are measured on generated graphs whereas others such as error rate are measured on event sequences (demonstration or traces) which could be the training sequences; i.e., sequences used to generate the graphs, or held out sequences. Similarly, our completeness metrics, i.e. the rate of unseen events in a sequence, can be measured on both training as well as held out sequences. Note that metrics computed on training sequences used to generate the graphs may not accurately Table 7 shows performance results for the four algorithms on the BBN dataset. The table includes aggregated as well as problem specific results to provide an estimate of the variability of algorithm's performance for different problems. As expected, the interaction networks comprise of a large number of nodes and edges that lead them to have significantly ($p<0.01$) lower compression ratio. Algorithms 2 (Heuristic Alignment) and 4 (Multiple Paths) are able to achieve the highest compression consistently for all five problems. The graphs shown in FIGS. 10a, 10b, 10c and 10d qualitatively verify this result. On the accuracy metrics, Algorithm 4 outperforms the other algorithms on average. However, it is significantly better ($p<0.001$) than Algorithm 1 and 3 on the incorrect edge accuracy metric. Furthermore, the high accuracy for incorrect edges for two of the three algorithms that use the retracted demonstrations partly validates the underlying assumption made by these algorithms. In contrast to the accuracy metrics, alignment based algorithms (2 and 3) outperform the multiple paths algorithm (4) on achieving a higher branching factor. The frequency based pruning underlying the selection of multiple paths in algorithm 4 leads to the elimination of certain novel edges. Based on the performance of these algorithms on the edge accuracy metrics we see many of these novel edges are likely to be inaccurate due to limited evidence for their classification in the training demonstrations. While the algorithms complement each other. Algorithm 4 seems to be a potential candidate for optimal tradeoff between the different metrics.

In terms of metrics based on unordered groups in a graph, we find that algorithm 4 leads to larger fraction of nodes (31%) to be included in unordered groups. Finally, we see that pruning significantly degrades the performance of Algorithm 4 on percentage of unseen events i.e. completeness. Since interaction networks losslessly embedded all events observed in the training demonstration, their performance on this metric is guaranteed to be flawless. In the next section, we will compare this result to their performance on held out demonstration sequences.

Algorithm 1 does not scale well onreadability metrics (Compression Ratio). The algorithms demonstrate stability in accuracy and completeness performance with increasing problem or data complexity. Algorithms 3 and 4 can produce a consistently low error rate despite increasing complexity. The rate of unseen events reduces by over 60% (relative) for a 10-fold increase in training data. This is also evidenced in the BBN dataset if we compare problems 1, 2 and 6 which have more data than problems 10 and 15. Finally, as is often the case with data-driven approaches, model robustness is dramatically improved with the use of more data.

It should now be appreciated a number of algorithms have been shown for automatically building example-tracing tutor models using multiple solution demonstrations that may be crowd-sourced or collected from a sample of users, such as learners of an online ITS, or through unsupported alternative learning activities such as tests. We note that the algorithms have complementary performance on the different desirable characteristics of the automatically generated behavior graphs. Based on Table 8, we would choose Algorithm 2 for its Readability metrics, Algorithm 4 for

TABLE 8

|  | Metrics | Algorithm 1 | Algorithm 2 | Algorithm 3 | Algorithm 4 |
| --- | --- | --- | --- | --- | --- |
|  | #Nodes | 79.1* | 5.4 | 6.0 | 6.6 |
| Readability | #Correct Edges | 147.9* | 12.8 | 18.3 | 17.5 |
|  | #Incorrect Edges |  | 24.2* | 33.4* | 19.5* |
|  | Compression Ratio | 6.7* | 77.3* | 66.8* | 60.2* |
|  | % Correct Edges | 39.1* | 42.2 | 42.6 | 44.1* |
|  | % Incorrect Edges |  | 99.9* | 97.5* | 99.5* |
| Accuracy | Training Error Rate | 51.3* | 25.2* | 17.7 | 17.4 |
|  | Heldout Error Rate | 42.7* | 23.4* | 16.0 | 15.6 |
| Completeness | % Training Unseen Events | 0.0 | 10.5* | 2.2* | 6.7* |
|  | % Heldout Unseen Events | 10.1* | 19.0* | 11.5* | 13.8* |
|  | Branching Factor | 2.2* | 11.1* | 12.6* | 8.5* |
|  | #Groups |  | 0.5* |  | 0.02* |
| Robustness | Avg. Group Size |  | 1.8* |  | 0.04 |
|  | % Group Coverage |  | 30.6* |  | 0.5 |

The performance of the algorithms on the Assistments dataset is shown in Table 8. Largely, the results on this dataset agree with the results on the BBN dataset. Algorithm 2 (Heuristic Alignment) outperforms all other algorithms on three of the readability metrics. Unlike the BBN dataset, the average compression ratio for Algorithm 2 is significantly better than the other algorithms including Algorithm 4 (Multiple Paths). Algorithm 4 significantly outperforms the other algorithms on three of the accuracy metrics. Because of their lossless nature. Interaction Networks (Algorithm 1) performs the best on Completeness metrics (% unseen events) as was the case with the BBN dataset. However, we find evidence of over-fitting of the algorithms to training data on this metric as indicated by the approximately 9% higher rate of unseen events for held out demonstrations for all the algorithms.

Figure 11A:
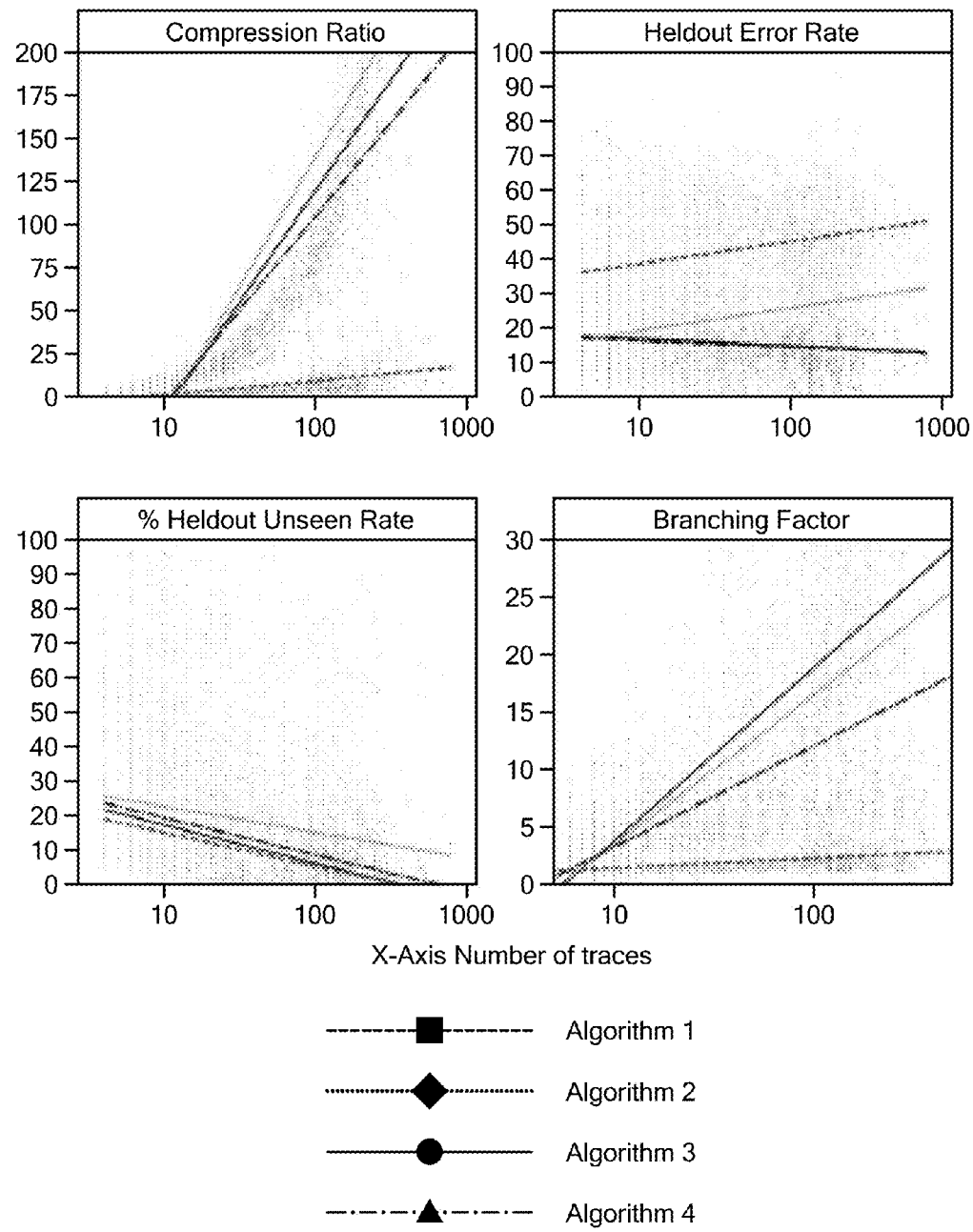
FIG. 11a is a chart showing algorithm performance for different number of training traces.
Figure 11B:
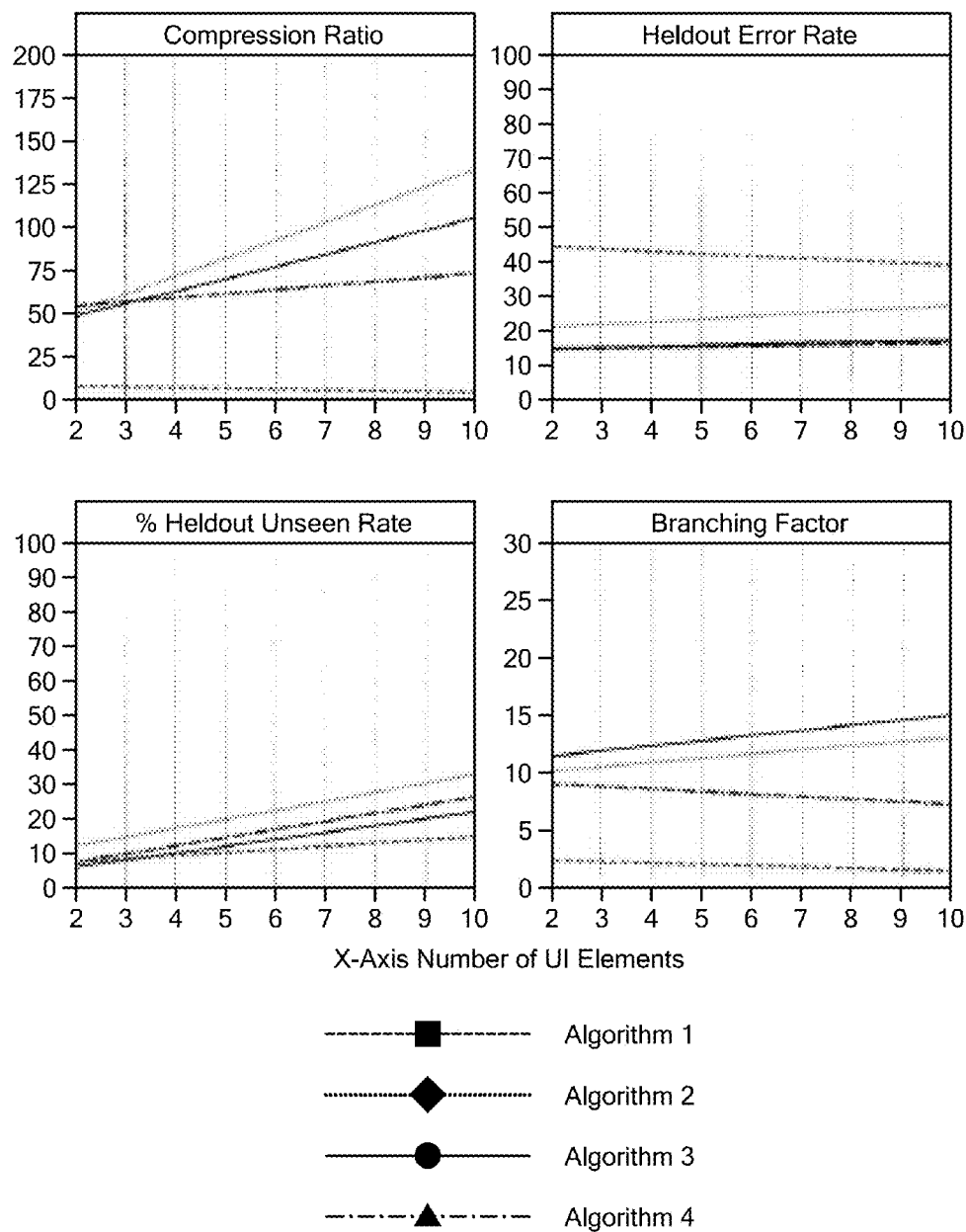
FIG. 11b is a chart showing algorithm performance for different number of UI elements in a problem.

While the results on the branching factor metrics of the Assistments dataset are consistent with the BBN dataset, Algorithm 2 outperforms Algorithm 4 on the metrics based on the unordered groups. Because Algorithm 2 identifies unordered groups that are larger in size than Algorithm 4, the groups found by the Heuristic Alignment algorithm have a higher coverage of the generated graphs, especially in the Assistments datasets where the number of UI elements is relatively small. FIGS. 11a and 11b further explores the tradeoff between the key metrics for larger number of traces (i.e., more training data) in FIG. 11a and increasingly complex problems (i.e., more UI elements) in FIG. 11b.

Accuracy, Algorithm 1 for Completeness and Algorithm 3 for the key Robustness metric.

Automatic Behavior Graph Generation (ABGG) algorithms analyze the similarities and difference between multiple solution demonstrations of a problem to induce a behavior graph that can serve as a tutor model for the problem. Behavior graphs are directed graphs. The nodes in this graph correspond to valid solution states. Non-terminal nodes represent partial solutions. Edges in the graph represent solution paths some of which are correct and lead to the next state while other are incorrect and usually lead back to the same state. Edges are annotated with the conditions that a behavior event must meet to traverse the path. Behavior graphs may contain multiple paths between two nodes. Multiple paths are useful to facilitate learner's exploration of alternate solutions to a problem especially in ill-defined learning domains. Behavior graphs may also include unordered groups. As the name suggests, states within an unordered group may be traversed in any order. Well-constructed behavior graphs have several desirable characteristics which motivate the design of metrics we use to evaluate ABGG algorithms.

Since the purpose of the behavior graphs is to serve as a tutor model, the primary metric for evaluating these models is their learning efficacy measured via use of the models by a relevant sample of learners. As described above, one of the key characteristics of behavior graphs that make them a popular model is that they are readable by ITS developers without requiring a deep understanding of computational or cognitive sciences. Automatically created behavior graphs should be editable with existing authoring tools to facilitate necessary manual annotation and modifications. Ideally, ABGG algorithms should create concise graphs without losing other desirable characteristics. This may involve collapsing redundant paths and even pruning spurious or infrequent edges. The conciseness of a graph can be measured using the number of nodes and edges in the graph. Our primary readability metric, Compression Ratio measures the rate at which an algorithm is able to reduce behavior events into behavior states (i.e. nodes) by finding similarities between events.

In order to minimize author effort, generated behaviors graphs should be as complete for creating an ETT as possible. As a minimal criterion, at least one valid path to the final solution should be included. Additionally, complete behaviors graphs are annotated with all the expected inputs by the learner. We use the Rate of Unseen Events in held out demonstrations as the primary metric to measure the completeness of our automatically generated behavior graphs. As described above behavior graphs should be error free. This includes being able to accurately capture the correct and incorrect events by learners depending on the current solution state. Edge accuracy measures the percentage of Correct and Incorrect edges that were accurately generated by the algorithm. Error Rate is a frequency weighted combination of edge accuracy that measures the fraction of learner events that will be inaccurately classified by the automatically generated behavior graph. We use the error rate of an automatically generate behavior graph on held out demonstrations as the primary accuracy metric.

As also described above, one of the reasons for the success of expertly crafted ETIs is the ability to use them with a wide range of learners under different deployment conditions. Automatically generated behavior graphs should retain this characteristic; e.g., by identifying alternate paths and unordered groups. It is not unforeseeable that the use of a data-driven approach could contribute to creating behavior graphs that are more robust than those authored by a human expert. Branching factor is the average number of data values available at each UI element. A large branching factor indicates the capability to process a large variety of learner inputs at each state. Also, the number and size of unordered groups is indicative of flexibility a graph affords to learners to explore the solution paths of a problem. Note that readability and robustness are complementary characteristics of a behavior graph. For example, a highly complex behavior graph may be very robust but may not be very readable.

As described above, we use four algorithms to generate behavior graphs using multiple solution traces of a problem. The first algorithm (Algorithm 1) generates interaction networks by sequentially collapsing identical events in solution traces into a shared node and creating a branch whenever two different events are found. Algorithm 2 uses a heuristic alignment technique to align similar events across multiple solution traces. The alignment is used to obtain a sequence of traversal through the problem's steps. Furthermore, this algorithm is able to use the positional entropy of a sequence of elements while obtaining the optimal sequence to identify unordered groups. Similar to the above algorithm, Algorithm 3 finds the optimal sequence between aligned events. However, this algorithm uses the Center Star Algorithm to align the multiple solution traces instead of the heuristic used by Algorithm 2. The Center Star Algorithm is a foundational algorithm used for aligning more than two sequences of symbols. It is particularly suited for our application because it is polynomial time in computational complexity and it does not make any assumptions about the space and relationship of symbols comprising the sequence.

First order transition matrix computed from solution traces can be used to represent a directed graph. Algorithm 4 considers ABGG as the process of finding multiple paths in a directed graph. Specifically, the longest (non-repeating) path in this directed graph represents the most likely path through the solution steps. Since, the problem of finding longest paths in general graphs is known to be NP-hard, we employ a combination of bounded longest path finding and an algorithm for finding multiple shortest paths in a transformed transition matrix to obtain a number of different paths through the directed graph. These paths are merged to construct a behavior graph similar to the process of constructing an interaction network. Algorithm 2, 3 and 4 assume that if two or more events within a trace were generated by the same UI element, the latter event corresponds to a correction of the data value input at the former events. In this case, we refer to the former events as retracted events and data values entered at these events are assumed to be incorrect values. Using this assumption, these three algorithms are able to automatically generate incorrect paths in behavior graphs unlike Algorithm1.

Table 9 characterizes the four algorithms described above based on their capabilities. Incremental addition of demonstrations to generate interaction networks does not identify incorrect input data values. However, using the assumption about retracted events, the other three algorithms are able to identify incorrect inputs. We notice that the Algorithms 2 and 3 are complementary in terms of their ability to find alternate paths and unordered groups. Algorithm 4 on the other hand offers both of these abilities.

TABLE 9

| Capability | Algorithm | | | |
| --- | --- | --- | --- | --- |
| | 1 | 2 | 3 | 4 |
| Identifies incorrect answers | N | Y | Y | Y |
| Generates alternate paths | N | N | Y | Y |
| Finds unordered groups | N | Y | N | Y |
| Generalizes beyond training demonstrations | N | Y | Y | Y |
| Guarantees all training demnstrs. will pass | Y | N | N | N |
| Finds atleast one path to final solution* | Y | Y | Y | N |
| Discovers new/unseen data values | N | N | N | N |

None of the algorithms discussed in this disclosure are capable of discovering unseen inputs beyond those seen in the solution traces. This type of generative ability is particularly useful for learning tasks, such as language learning, where a large number of different inputs may be expected from the learners. In our ongoing work, we use a number of heuristics as well as grammar induction techniques to generate unseen inputs for certain nodes in the behavior graphs.

We use three datasets, accessed via DataShop, to study the cross-domain applicability of ABGG algorithms. These datasets were filtered to use only problems that had six or more traces and had at least two UI elements. Also, we eliminated all events, such as help requests, that did not correspond to user input at a solution step. In this way, the datasets were transformed into solution traces. A solution trace/demonstration comprises of a sequence of user interface (UI) events. Each event is represented as a 2-tuple e=(u, d) that includes an identifier u of the UI element and data d associated with the event. A UI element may be visited any number of times within a trace. In general, data can include one or more attributes of the event such as the event type, user input, event duration, etc. In this disclosure, we assume single data attribute events where the data captures the learner input at the UI element.

TABLE 10

|  | Math. | Physics | French |
|---|---|---|---|
| #Problems | 1013 | 497 | 71 |
| Max. #Unique Elements | 33 | 62 | 10 |
| Avg. #Unique Elements | 4.6 | 9.7 | 2.5 |
| Avg. #Training Traces | 76.0 | 26.6 | 12.1 |
| Avg. #Heldout Traces | 38.0 | 13.3 | 6.1 |
| Avg. #Events Per Trace | 5.3 | 8.9 | 4.7 |

Figure 12:
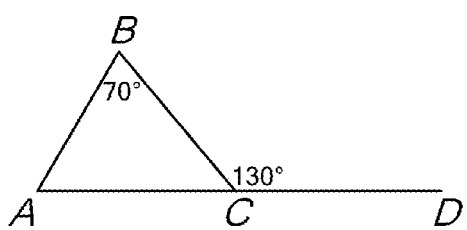
FIG. 12 is a diagram of an example math problem from Assistments.

Table 10 provides some statistics about the problem and traces for each of learning domains used in this work. The Mathematics traces were derived from three Assistments datasets. Assistments is a web-based learning platform, developed by Worcester Polytechnic Institute (WPI), that includes a Mathematics intelligent tutoring system for middle & high school grades. FIG. 12 shows an example math problem from the Assistments system. Together, these datasets are the largest of the three domains we use. Prior to filtering, these dataset comprised a total of 683,197 traces and 1,905,672 events from 3,140 problems. For our experiments, we treat the three datasets to be independent of each other to account for change in UI designs of the problems common to the three datasets. We used 10 (out of 20) of the largest datasets released under the Andes2 project to build the collection of Physics problems and traces. Andes2 is an intelligent tutoring system that includes pedagogical content for a two-semester long college and advanced high-school level Physics course. These ten datasets are based on logs from several semesters of use of the Andes2 system at the United States Naval Academy. Prior to filtering, these dataset comprised a total of 81,173 traces and 1,162,581 events from 2,187 different problems. Note that, as is case with the Math dataset, we treat the ten Andes2 datasets independently. Note that, unlike typical domain independent example-tracing based tutor, the Andes2 systems uses a model-tracing approach for tracking learner's solution of a problem and to provide feedback. The domain knowledge dependent model tracer is able to match highly inflected learner inputs (e.g. variable names) to its solution graph. Despite this difference in tutoring approach used by the Andes2 system, we decided to include this domain in our experiments to study the performance of our algorithms on such solution traces.

Finally, the French traces are based on two dataset from the "French Course" project on DataShop. These datasets were collected from logs of student's use of the "French Online" course hosted by the Open Learning Initiative (OLI) at Carnegie Mellon University. FIG. 13 shows steps from a couple of example problems from this course. These datasets comprised a total of 37,439 traces and 253,744 events from 1,246 different problems. Note that a significantly larger fraction of French problems were eliminated due to the filtering criterion compared to Mathematics or Physics. The datasets used in our experiments contain solution traces. Traces are paths through an existing behavior graph, unlike behavior demonstrations which are unconstrained by existing tutor models. In addition to the fact that these are the only available large scale collection of solution paths, we use these datasets in our experiments because these traces have been collected from a large set of real users. They contain realistic variations in learner inputs similar to demonstrations.

We use a three-fold cross validation design that splits the available traces into three different training and held out sets. The readability metrics (i.e. number of nodes, number of edges and compression ratio) as well as the robustness metrics (branching factor, number of unordered groups, average group size and coverage of graph within groups) are reported on the behavior graphs generated by the algorithms. On the other hand, some accuracy metrics such as the accuracy of correct and incorrect edges are measured on generated graphs whereas others such as error rate are measured on event sequences which could be the training traces; i.e., sequences used to generate the graphs, or held out traces. Similarly, our completeness metrics, i.e. the rate of unseen events in a sequence, can be measured on both training as well as held out traces. Note that the metrics computed on training traces used to generate the graphs may not accurately indicate the performance of an algorithm due to over-fitting. This is the motivation for choosing the cross validation based experimental design.

TABLE 11

| | Mathematics (Assistments) | | | | Physics (Andes2) | | | | French (OLI) | | | |
|---|---|---|---|---|---|---|---|---|---|---|---|---|
| Algorithm u | 1 | 2 | 3 | 4 | 1 | 2 | 3 | 4 | 1 | 2 | 3 | 4 |
| #Nodes | 79.2 | 5.4* | 6.0* | 6.6* | 147.8 | 7.9* | 11.5* | 11.7* | 25.6 | 3.8* | 4.5* | 4.5* |
| #Correct Edges | 148.0 | 12.9* | 18.3* | 17.5* | 182.2 | 43.5* | 76.4 | 34.5* | 37.2 | 6.9 | 9.8 | 9.5 |
| #Incorrect Edges | | 23.9 | 33.5 | 19.5* | | 35.1 | 53.8 | 13.4* | | 4.2 | 11.0 | 8.0 |
| Compression Ratio | 6.7 | 76.8* | 66.8 | 60.2 | 2.3 | 51.6 | 21.9 | 21.2 | 2.2 | 14.6 | 12.8 | 12.8 |
| % Accurate Correct Edges | 39.1 | 41.9 | 42.5* | 44.1* | 61.4 | 80.2* | 58.9 | 86.8* | 22.5 | 27.7* | 26.9* | 29.8* |
| % Accurate Incorrect Edges | | 99.9* | 97.2 | 98.5* | | 92.5* | 67.3 | 85.5 | | 97.8* | 36.1 | 87.2 |
| Training Error Rate | 51.4 | 25.4 | 17.7* | 17.5* | 33.6 | 17.2* | 25.8 | 24.3 | 75.2 | 56.1 | 22.5* | 25.3* |
| Heldout Error Rate | 42.8 | 23.2 | 16.1* | 15.7* | 29.1 | 25.5* | 33.3 | 30.8 | 47.3 | 35.9 | 19.9* | 18.5* |
| % Training Unseen Events | 0.0* | 10.7 | 2.2 | 6.8 | 0.0* | 14.1 | 12.2 | 24.6 | 0.0* | 13.4 | 5.2 | 4.3 |
| % Heldout Unseen Events | 10.2* | 10.1 | 11.5* | 13.9 | 35.9* | 41.7 | 38.4* | 42.6 | 31.7* | 40.7 | 34.4* | 34.3* |
| Branching Factor | 2.2 | 10.9 | 12.6* | 8.5 | 1.5 | 13.4* | 12.9* | 6.0 | 1.6 | 6.7* | 9.4* | 7.8* |
| #Groups | | 0.5* | | 0.0 | | 0.8 | | 1.4* | | 0.3* | | 0.1 |
| Avg. Group Size | | 1.9* | | 0.0 | | 2.0 | | 3.0 | | 0.6* | | 0.3 |
| % Group Coverage | | 31.8* | | 0.5 | | 27.2 | | 36.6* | | 15.4* | | 6.1 |

*indicates significant (p < 0.05) difference with the other algorithms (within the same dataset)

Figure 14:
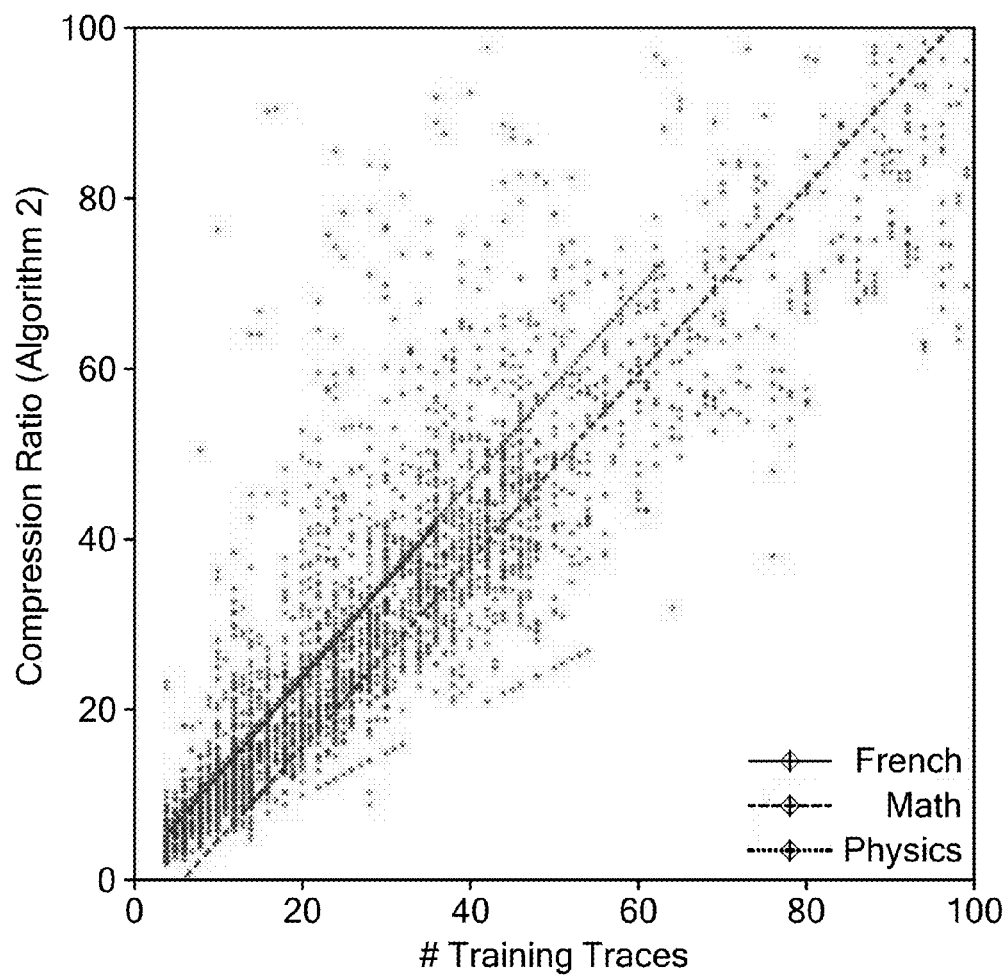
FIG. 14 is a chart showing compression ratio of algorithm 2.
Figure 15:
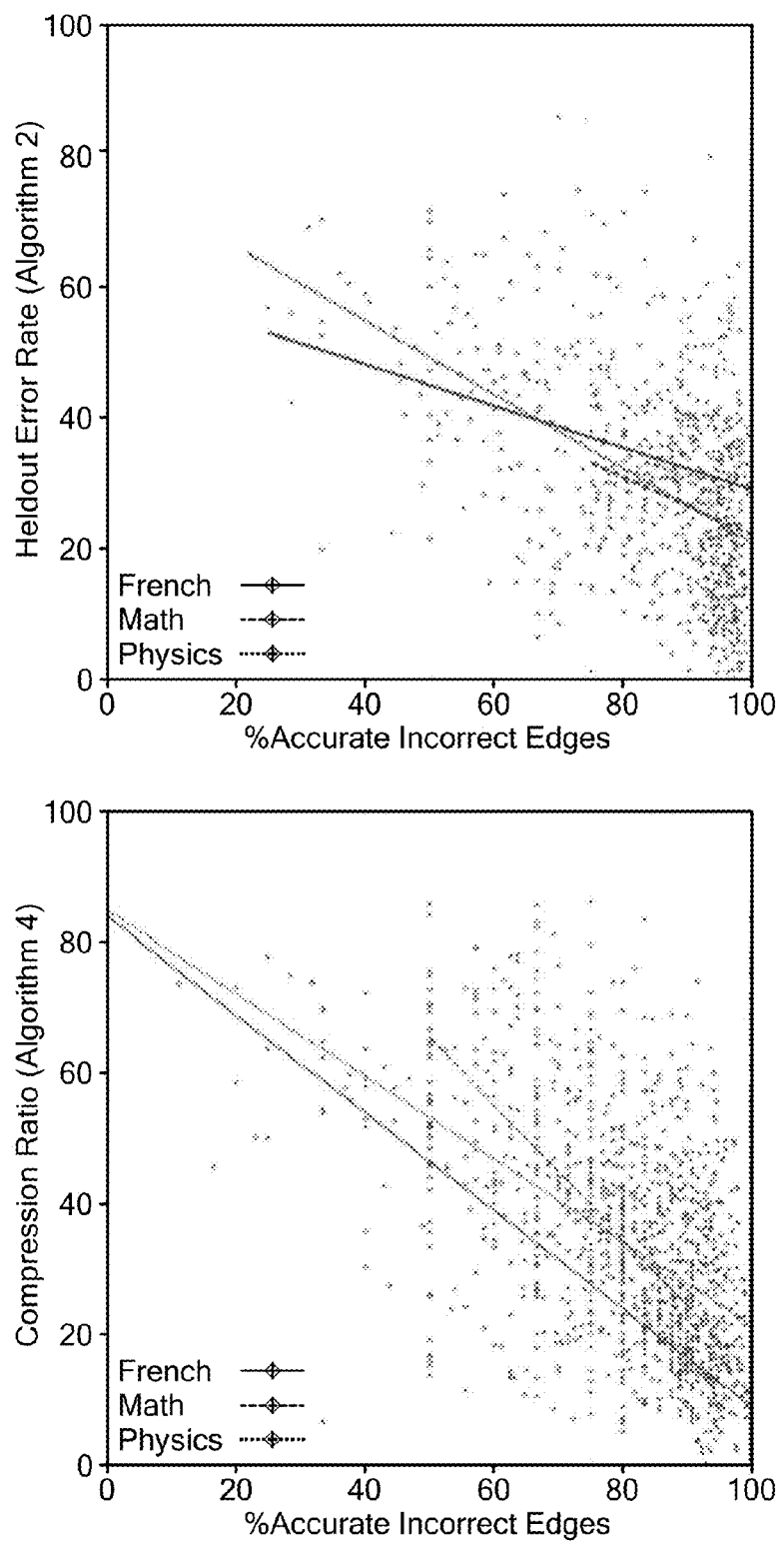
FIG. 15 are charts showing heldout error rate of algorithms 2 and 4.

Table 11 shows our results along 14 metrics for each of the four algorithms applied to the three learning domains under consideration. Reported metrics are averaged over three cross validation splits as well as over all the problems for each domain. The metrics are organized by the four desirable characteristics discussed earlier. Primary metric for each characteristic is highlighted. As expected, the interaction networks comprise of a large number of nodes and edges that lead them to have significantly smaller compression ratio. Algorithm 2 (Heuristic Alignment) outperforms all other algorithms on three of the readability metrics. On the other hand, Algorithm 4 (Path Pruning) significantly outperforms the other algorithms on three of the accuracy metrics for this dataset and is not significantly worse on the fourth metric. Because of their lossless nature, Algorithm 1 (Interaction Network) performs the best on Completeness metrics (% unseen events). However, it is not significantly better than Algorithm 3 (Center-Star Alignment). We find evidence of overfitting of the algorithms to training traces on this metric as indicated by the approximately 9% higher rate of unseen events for held out traces for all the algorithms. Algorithm 3 significantly outperforms the other algorithms on the primary robustness metric (Branching Factor) for this domain. Algorithm 2 is better than Algorithm 4 for the metrics based on unordered groups. On the primary readability metric (Compression Ratio), Algorithm 2 outperforms the others on the Physics dataset as was the case with Mathematics. This is consistent with prior conclusion on the use of Algorithm 2 for readability. We note that the Physics dataset has significantly lower compression ratio than the previous dataset. FIG. 14 shows a scatter plot and domain-specific regression fits for the compression ratio of Algorithm 2 for different problems with different number of training traces and UI elements. We see that for equivalent number of training traces, the compression ratio for Physics is actually slightly better than Mathematics. However, as we know from Table 10, fewer training traces are available for the Physics problems on average. On the primary accuracy metric, we find that Algorithm 2 works best for Physics unlike the case with the Mathematics domain. We can note that the Algorithm 2 is significantly better on the accuracy of incorrect edges. FIG. 15 shows the relationship between the error rate in heldout traces and the accuracy of incorrect edges. We also see that the percentage of unseen events in heldout traces is significantly higher for Physics. The lower incorrect edge accuracy and higher percentage of unseen events can be attributed to the differences in the tutoring approach underlying the Andes2 system which uses domain-specific knowledge to match a large variety of inputs from the learner at each step of the solution. Because of this, Andes2 elicits significantly diverse (& hence novel) inputs across traces. Algorithms 2 and 3 are not significantly different in terms of the primary robustness metric.

Figure 16:
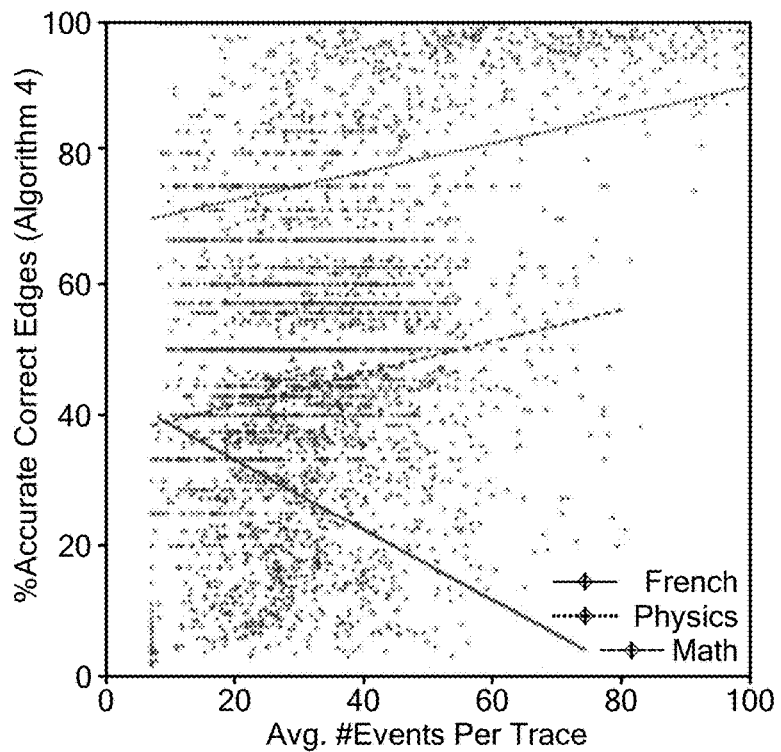
FIG. 16 is a chart showing accuracy of correct edges for algorithm 4.
Figure 17:
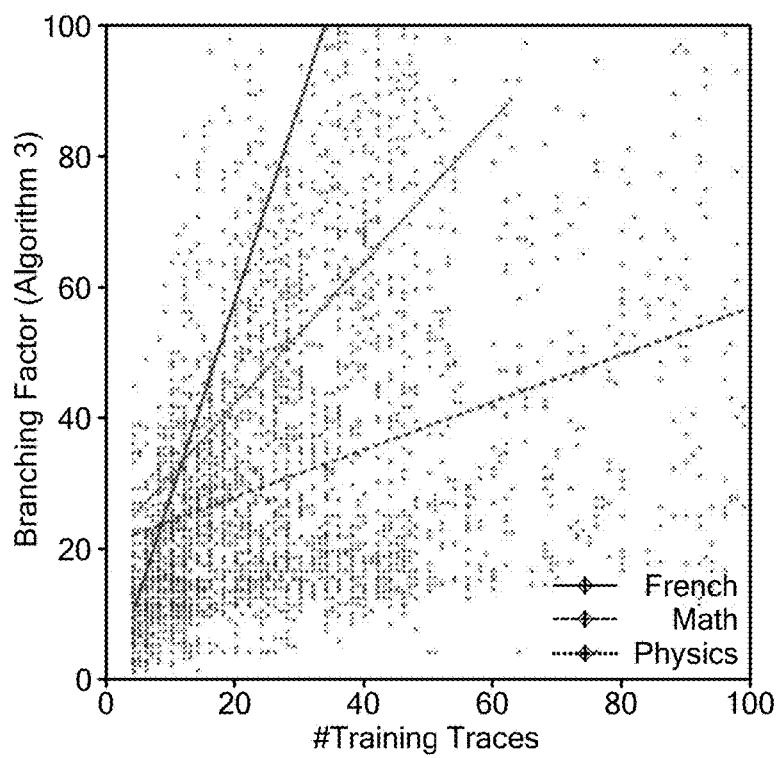
FIG. 17 is a chart of a branching factor of algorithm 3.
Figure 18A:
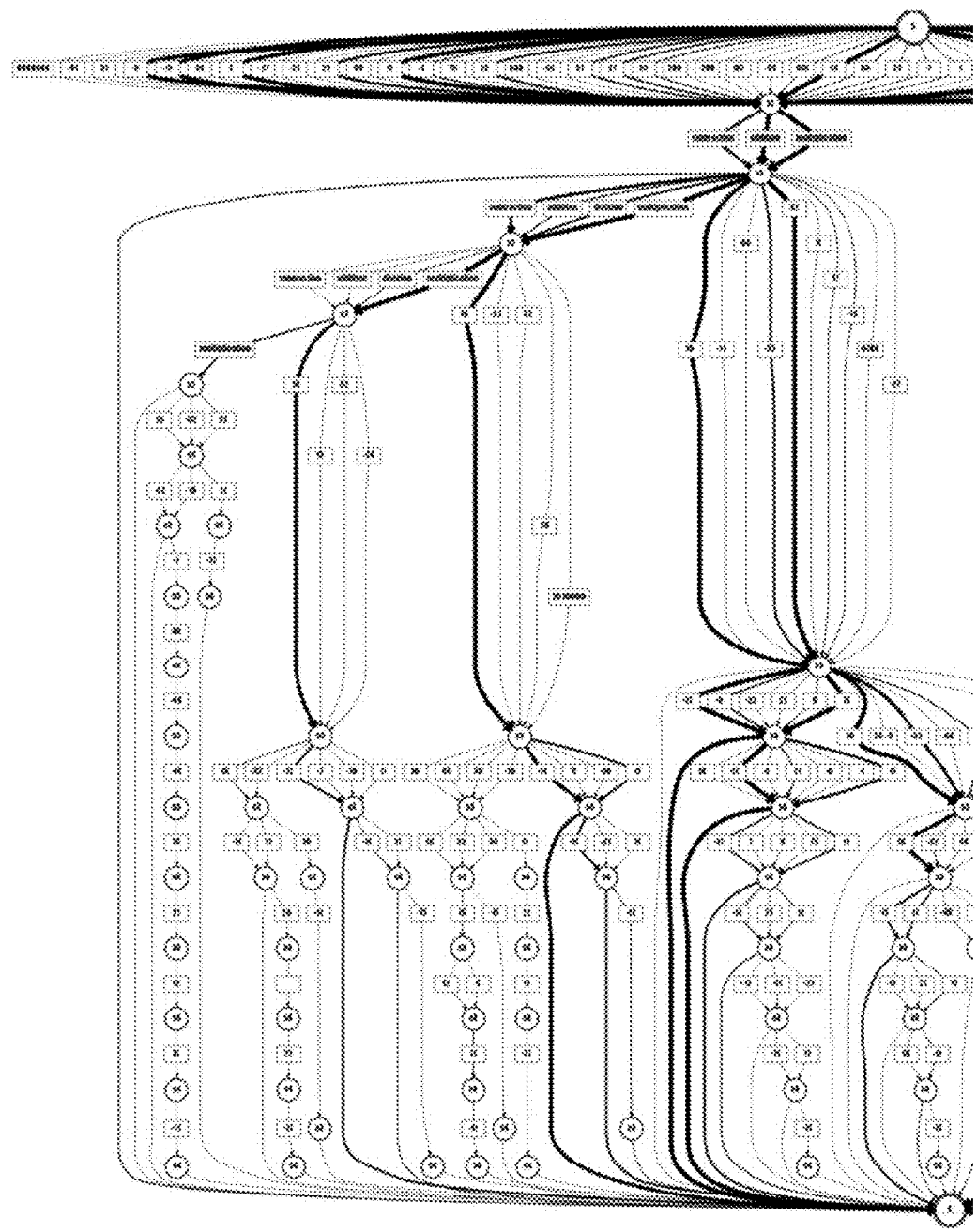
FIG. 18a is a diagram of a behavior graph for mathematics with algorithm 1.
Figure 18A:
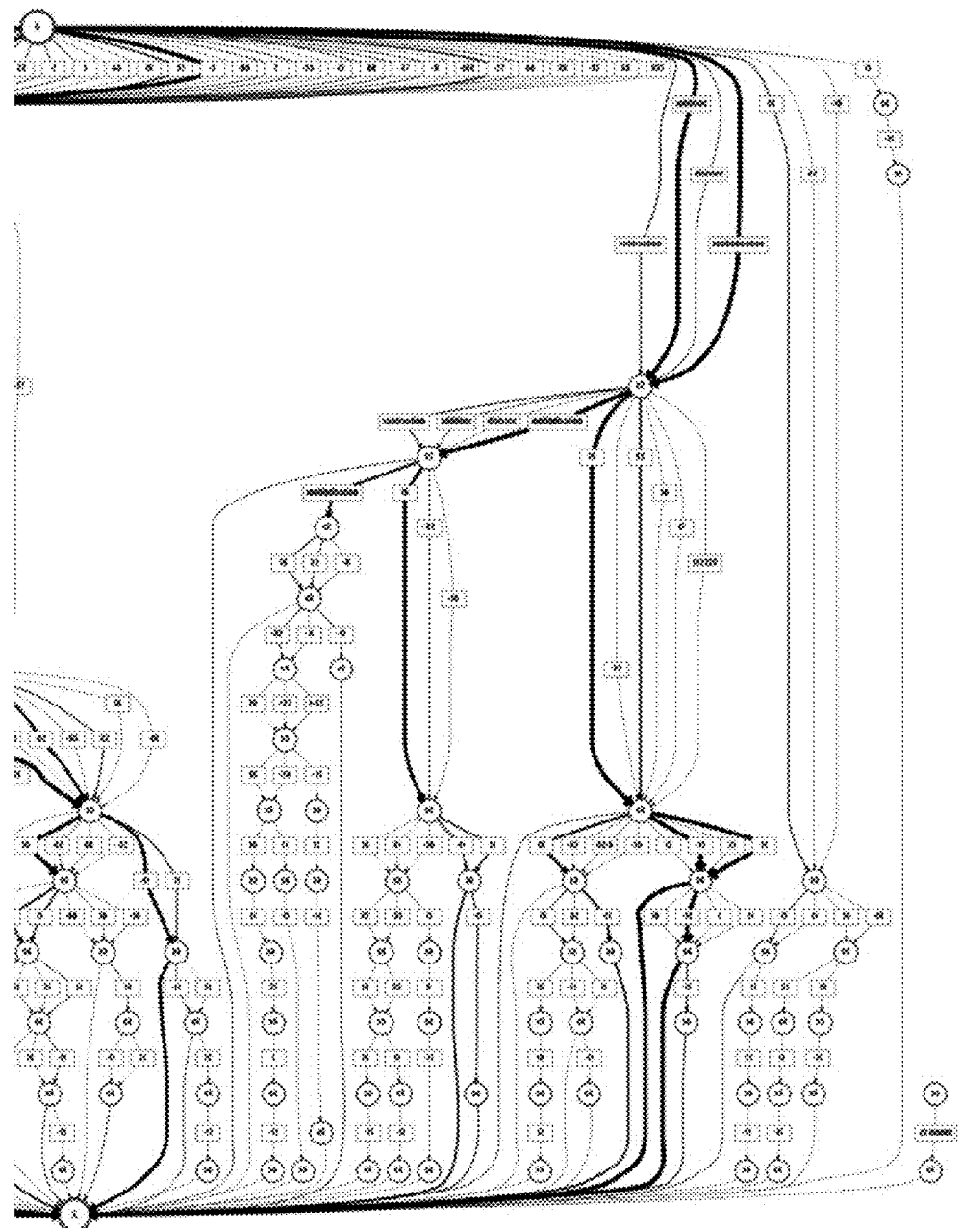
Figure 18B:
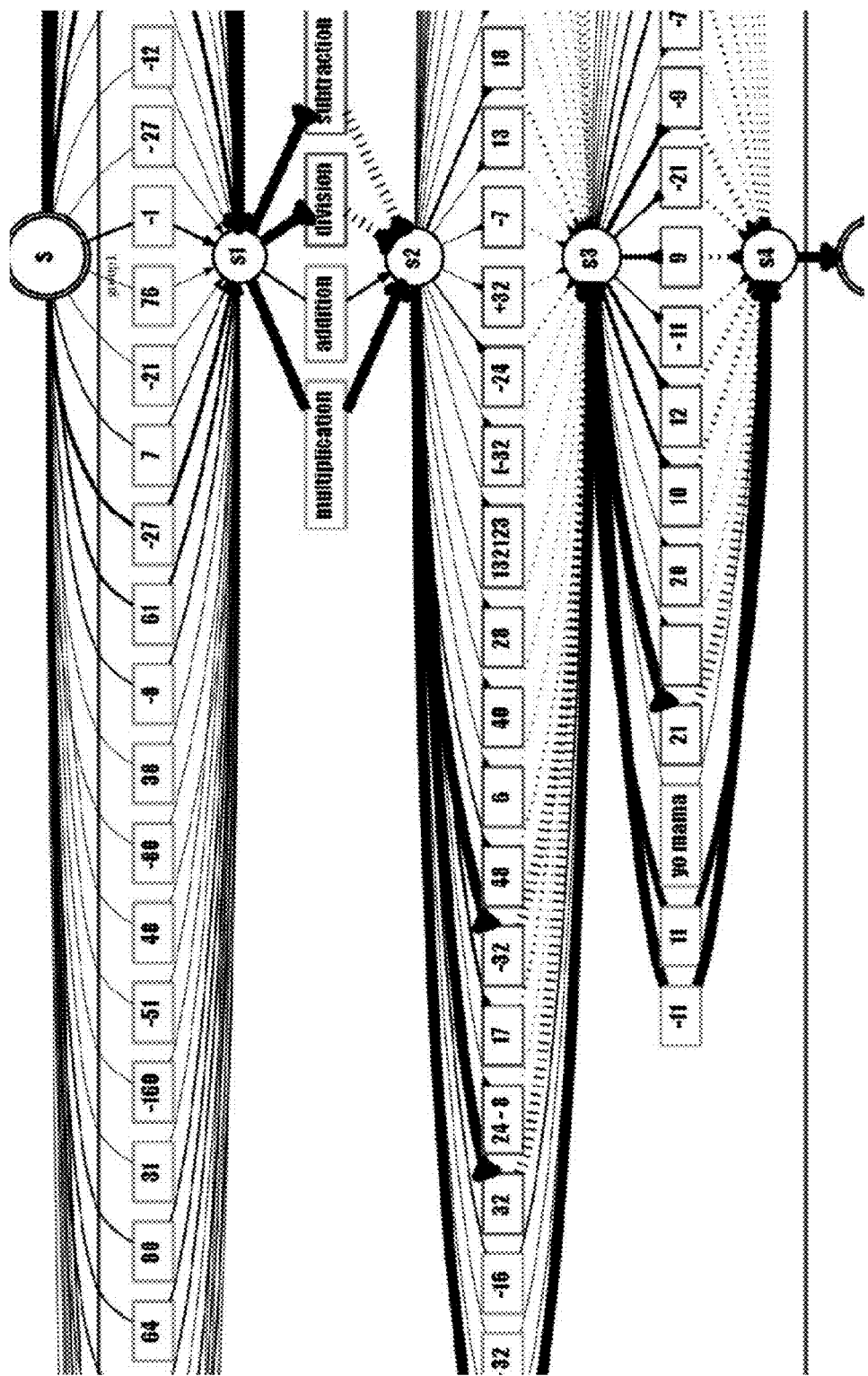
FIG. 18b is a diagram of a behavior graph for mathematics with algorithm 2.
Figure 19:
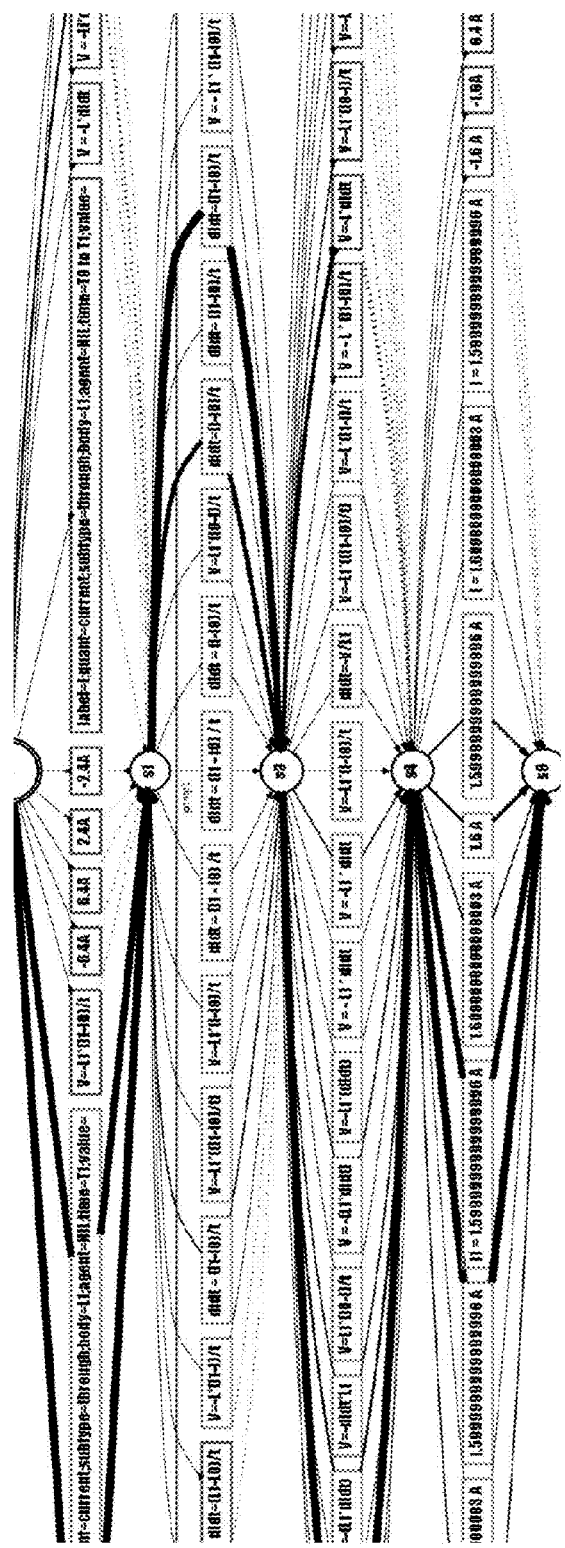
FIG. 19 is a diagram of a behavior graph for physics with algorithm 2.
Figure 20A:
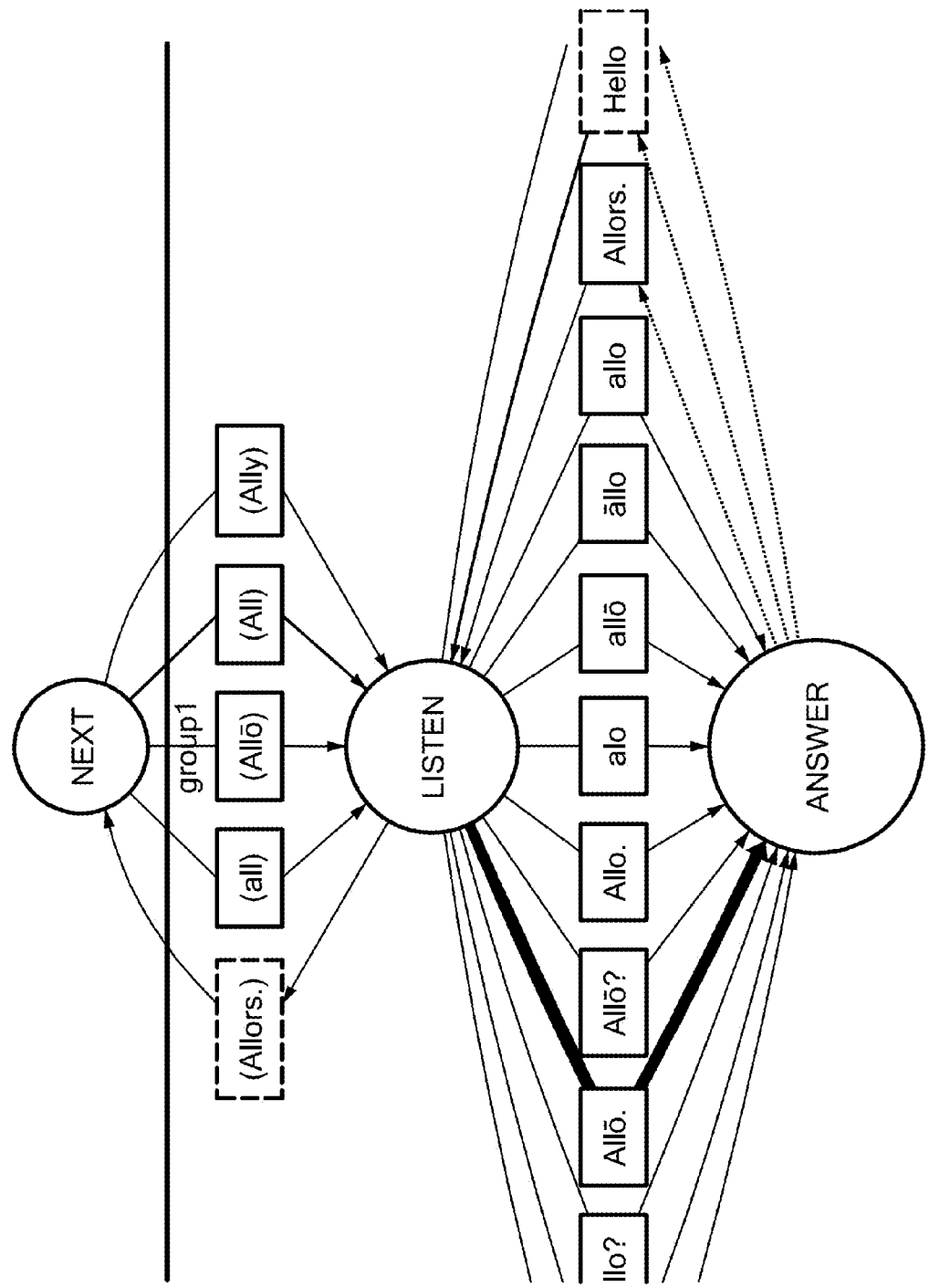
FIG. 20a is a diagram of a behavior graph for French with algorithm 2.
Figure 20B:
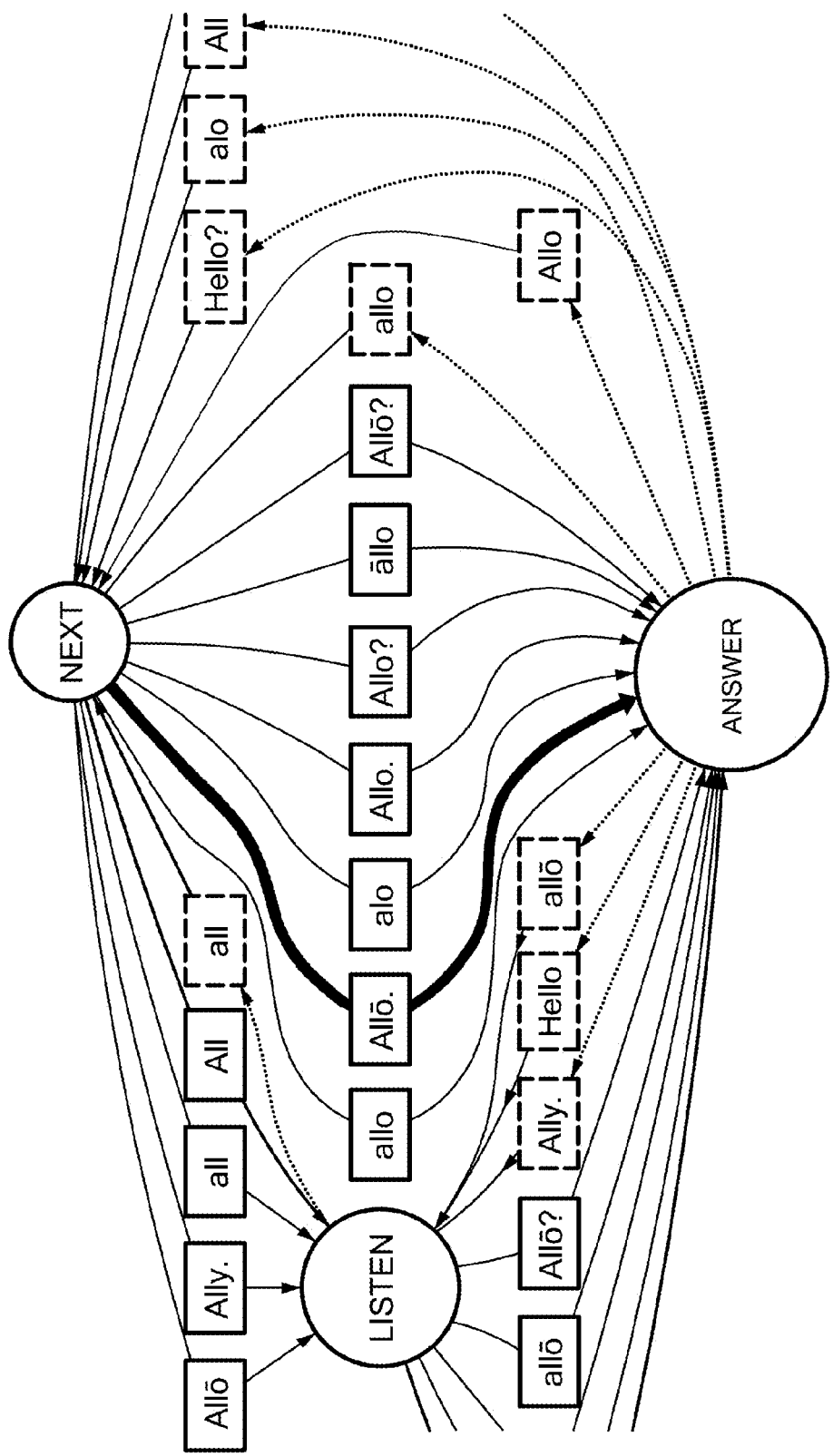
FIG. 20b is a diagram of a behavior graph for French with algorithm 4.

The results for our non-STEM domain are largely consistent with the Mathematics domain. This may be attributed to the similarities of the underlying tutoring approach for the Assistments system and the French Online course which has been developed using the Cognitive Tutor Authoring Tools (CTAT). However, we can notice two key differences. First, the accuracy of correct edges for this domain is significantly lower. Because the French Online Course is deployed on an publicly accessible platform, its likely that a large number of the solution traces were generated by beginners as well as non-serious users leading to the dataset containing many incomplete solution traces containing no correct answers. This is evidenced in FIG. 16 as we see that correct edge accuracy dramatically degrades for long traces which is contrary to the case with the other two domains. Second, we expect the branching factor to be higher for a language learning domain, due to the high degree of linguistic variation in learner inputs. The results in Table 11 do not indicate this. However, FIG. 17 verifies this intuition. Branching factor for the French behavior graphs is higher than those for the STEM domain for problems that have 10 or more traces. FIGS. 18a, 18b, 19, 20a and 20b showcase several qualitative characteristics of automatically generated behavior graphs (truncated to fit) for the problems in the three datasets used in this work. As described above, we use the following visual convention: Circular nodes represent states and are labeled with identifiers u of the corresponding UI element. Edges are labeled with the data values d. Correct edges are labeled with green rectangles and incorrect edges are labeled with red rectangles. Unordered groups are shown using blue containers. FIGS. 18a and 18b shows graphs generated by two different algorithms for the same Mathematics problem in the Assistments dataset using 241 solution traces by learners. The graph generated by Algorithm 1 is dense and hardly readable due to the large number of nodes and edges in this graph. Also, as discussed above, this algorithm is unable to identify incorrect paths. Contrary to that, the graph in FIG. 18b is composed of only 6 nodes. The various paths taken by learners are compressed into 46 correct and 39 incorrect edges. We can notice that not all paths are accurate. However, the accurate paths are more frequent, as indicated by the thicker arcs associated with the edge. It should be noted, these algorithms can use this frequency attribute to eliminate inaccurate paths (either automatically, or by providing additional controls to model developers in authoring tools). A behavior graph from the Physics dataset is shown in FIG. 19. As discussed earlier, the large variation in learner input at each state is depicted in the edge labels of this graph. We notice that for the last state (s6) which corresponds to the learners filling in the answer to a problem, many minor variations of the correct answer are accurately captured. Due to the domain independent nature of our algorithms, these answers are treated as different string. Integration of domain knowledge can lead to further compression of these answers into a single path. The linguistic variation in the inputs to a problem in the French dataset is also noticeable in the two graphs for the same problem in FIGS. 20a and 20b. We can see the several wrong answers are marked as correct answers (and vice versa), although the frequency-based edge notation identifies the correct answer as was the case in FIG. 20b. In this problem, learners are asked to listen to an audio file and type in the French word they hear. Learners are allowed to go back and forth between these two steps. The first step has no wrong answer. We notice that our assumption to consider retracted events as incorrect fails in this case. It is particularly interesting to note the differences in the way Algorithm 2 and Algorithm 4 encode robustness into the learnt tutor model. While Algorithm 2 identifies an unordered group containing the listen and answer nodes which allows learners to traverse these nodes in any order, Algorithm 4 identifies that the listen step is optional and create two different way to reach the answer step based on the solution behaviors exhibited by learners in the traces.

It should now be appreciated; we have shared results from an empirical analysis of application of ABGG algorithms to three different learning domains. Several similarities and differences between the performances of four algorithms on problems from these three domains were discussed above. While we have recommended the use of Algorithm 2 as the default ABGG algorithm for use within authoring tools for some applications, we find that for language learning domains. Algorithm 4 may be preferable since it is the most accurate on the French dataset and not significantly worse than the other algorithms on the other primary metrics. For example, in the French domain, we found steps that do not have any wrong answer. For broad use. ABGG algorithms should identify these UI elements and selectively apply the powerful assumption about retracted events. Furthermore, the algorithms can exploit additional features computed from across the multiple traces, such as the frequency of a data value at a node, to improve the accuracy of the automatically generated behavior graphs.

Figure 21:
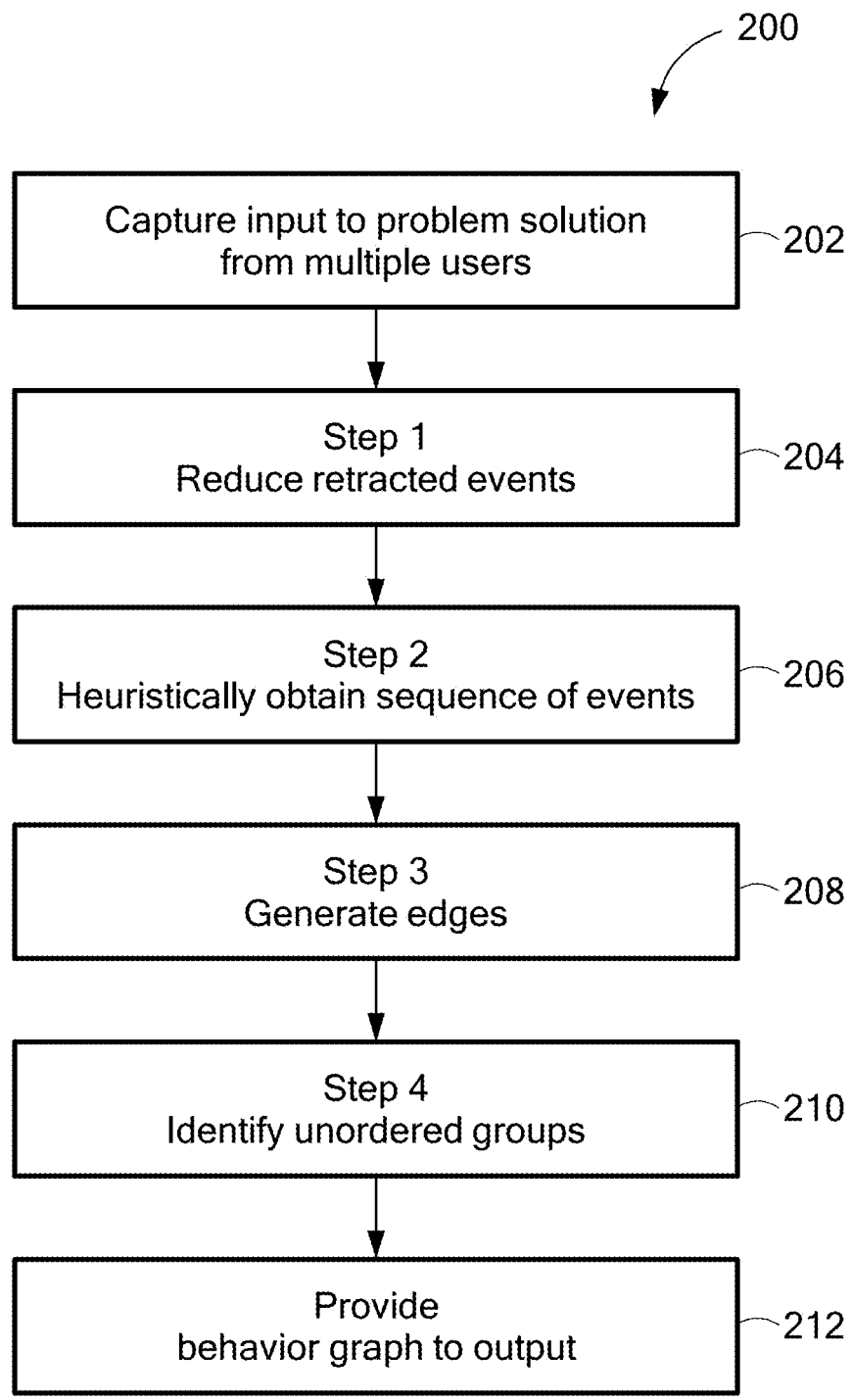
FIG. 21 is a flow chart showing a technique of generating a behavior graph.

Having described various features, it should now be appreciated a tutor model building system includes a user interface device having a monitor to present to a user a predetermined learning interface of a problem requiring a solution and input device for the user to enter data showing actions taken to arrive at a solution into the system; a computer to capture the actions entered by the developer user and to generate a behavior demonstration associated with the actions entered and to combine a plurality of behavior demonstrations created from a plurality user entered data to a behavior graph; and an output device to provide the behavior graph to an authoring tool. As shown in FIG. 1, a learning environment is presented wherein a problem statement is presented to a student such that the student is allowed to solve the problem at any time. Hints and Feedback are provided at the bottom of the screen and solution steps are offered on the right when the student asks for help to lead a student through a good way of solving the problem. To develop such a learning environment, behavior graphs are created. As described above in connection with FIGS. 6a-6c, with a user interface development tool such as a WYSIWYG editor, a problem is presented to a developer user in Stage 1 and during Stage 2, a sequence of behavior events are captured from multiple users, here using programming-by-demonstration tools and preliminary behavior graphs are derived from the events. Unlike prior systems where a single user input was used, multiple developer users are used during Stage 2 and presented with the problem so that multiple behavior sequences are collected instead of one. As to be described further herein below, FIG. 21 shows a simplified flow chart of the steps to generate a behavior graph.

Figures 22, 23:
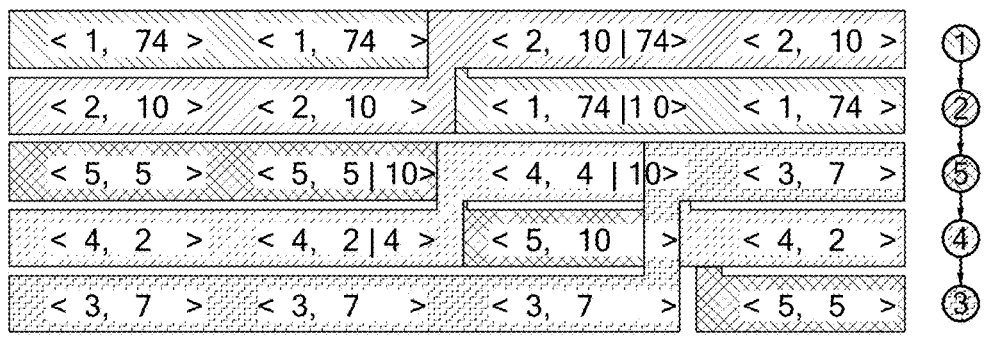
FIG. 22 is a diagram of behavior demonstration data as the data in the events are reduced.
FIG. 23 is a diagram showing sequence states of behavior demonstration data.

Referring now also to FIG. 22, a plurality of input demonstrations are concluded by a multiple users in a correct and complete solution of the learning task as shown in processing block 202. It is assumed later events at the same element correspond to corrections and the number of events are reduced by reducing retracted events in step 1 as shown in processing block 204. As shown in processing block 206, in step 2, the inputs are reviewed and heuristically obtains a sequence of events with the objective to finding only one path as shown in FIG. 23. As shown in processing block 208, in step 3, edges are generated where correct as well as incorrect edges are generated as shown in FIG. 24. Frequency of result can be used as a confidence measure. As shown in processing block 210, in step 4, unordered groups are identified based on frequency of interchangeability of state sequence. A resulting behavior graph fabricated from the behavior of multiple users instead of one user is provided as an output as shown in processing block 212. It should be appreciated the above process identifies edges corresponding to correct and incorrect actions and all observed inputs in elements are incorporated. Preferably no alternative paths are found and all unordered groups are found during the observed inputs, hence the more observed inputs that can be captured will increase the accuracy of the behavior graph. As described above, depending on the subject matter of the learning system, a different predetermined algorithm may be used better suited for that subject matter. It should be appreciated from the above disclosure, such a technique to generate a behavior graph although requiring more work to generate the behavior graph, reduces the amount of authoring effort of a domain expert during the authoring step of creating a learning environment.

Having described various features of a tutor model building system, it should be appreciated a developer user would use an existing structure interface selected for the learning environment being contemplated such that feedback and help as well as other types of support can be provided to a learning user once the learning system is finalized. Once a structure interface is selected, a plurality of users attempt the solution of the selected structure interface and continue until they find the desired solution. As each of the plurality of developer users goes through the solution, a behavior graph is created for their solution path. With each of the behavior graphs, mistakes that a developer user may make are also collected. Depending upon the complexity of the structure interface selected, the number of developer users that attempt the solution may be increased since the more developers that attempt the solution, the greater likelihood that all solutions have been attempted and captured including the preferred solution. From the plurality of behavior graphs collected, the behavior graphs are collapsed to a preferred behavior graph for the desired learning experience using the selected structure interface.

According to the disclosure an article includes: a non-transitory computer-readable medium that stores computer-executable instructions, the instructions causing a machine to: using a predetermined learning interface, capture various actions taken by a user to arrive at a solution; generate a behavior demonstration for the various actions taken for each user solution; combine the behavior demonstrations to generate a behavior graph; and providing the generated behavior graph to a tutor authoring tool so that the tutor authoring tool can insert support in the form of hints and feedback to support a student performing the learning activity. In addition, a tutor model building system includes: a user interface device having a monitor to present to a user a predetermined learning interface of a problem requiring a solution and input device for the user to enter data showing actions taken to arrive at a solution into the system; a computer to capture the actions entered by the developer user and to generate a behavior demonstration associated with the actions entered and to combine a plurality of behavior demonstrations created from a plurality user entered data to a behavior graph; and an output device to provide the behavior graph to an authoring tool. Furthermore, a method for developing a tutor model includes: using a predetermined learning interface, capturing various actions taken by a user to arrive at a solution; generating a behavior demonstration for the various actions taken for each user solution; combining the behavior demonstrations to one behavior graph; and providing the behavior graph to a tutor authoring tool.

It should also be appreciated the above technique can be used to develop a tutor system in any learning environment and no knowledge of the domain is required. The system is domain independent and can be used to develop any tools, tactics and techniques where it is desirable to capture a preferred solution to a problem.

Figure 26:
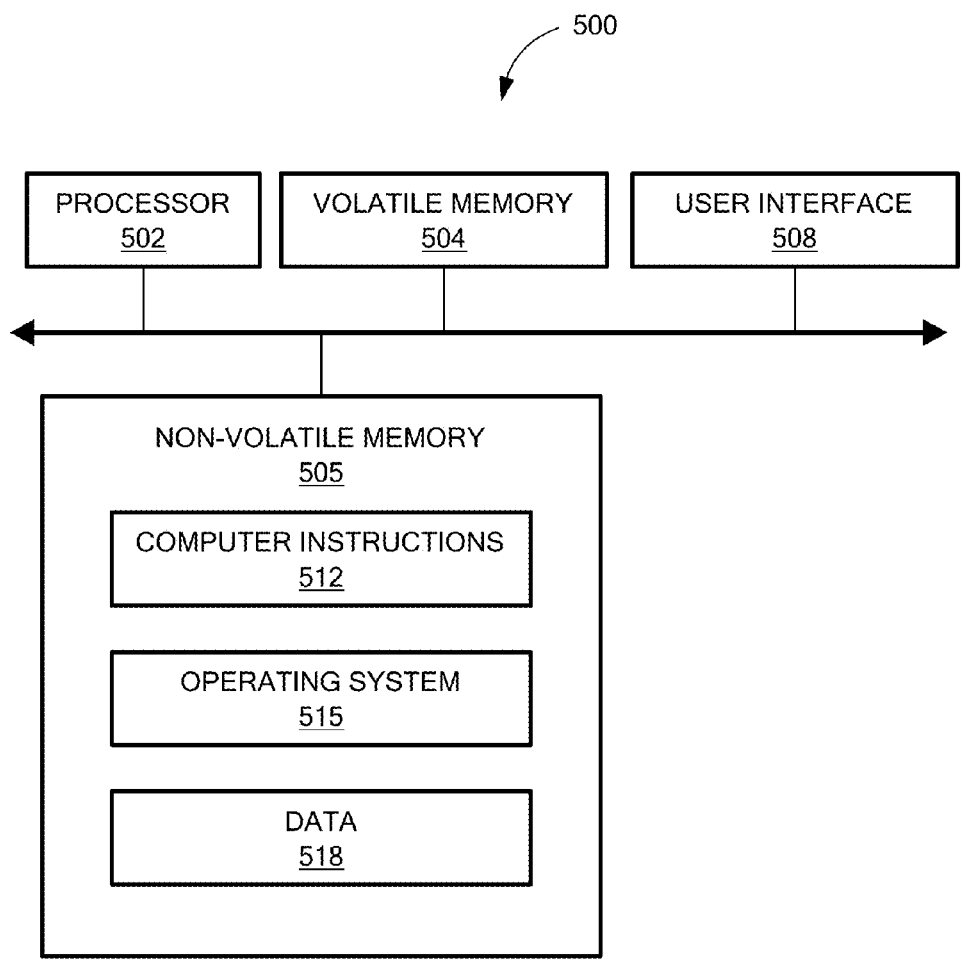
FIG. 26 is a diagram of a computer system to implement a tutor building model system.

Referring to FIG. 26, a computer includes a processor 502, a volatile memory 504, a non-volatile memory 506 (e.g., hard disk) and the user interface (UI) 508 (e.g., a graphical user interface, a mouse, a keyboard, a display, touch screen and so forth). The non-volatile memory 506 stores computer instructions 512, an operating system 516 and data 518. In one example, the computer instructions 512 are executed by the processor 502 out of volatile memory 504 to perform all or part of the processes described herein.

The processes and techniques described herein are not limited to use with the hardware and software of FIG. 26; they may find applicability in any computing or processing environment and with any type of machine or set of machines that is capable of running a computer program. The processes described herein may be implemented in hardware, software, or a combination of the two. The processes described herein may be implemented in computer programs executed on programmable computers/machines that each includes a processor, a non-transitory machine-readable medium or other article of manufacture that is readable by the processor (including volatile and non-volatile memory and/or storage elements), at least one input device, and one or more output devices. Program code may be applied to data entered using an input device to perform any of the processes described herein and to generate output information.

The system may be implemented, at least in part, via a computer program product, (e.g., in a non-transitory machine-readable storage medium such as, for example, a non-transitory computer-readable medium), for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a non-transitory machine-readable medium that is readable by a general or special purpose programmable computer for configuring and operating the computer when the non-transitory machine-readable medium is read by the computer to perform the processes described herein. For example, the processes described herein may also be implemented as a non-transitory machine-readable storage medium, configured with a computer program, where upon execution, instructions in the computer program cause the computer to operate in accordance with the processes. A non-transitory machine-readable medium may include but is not limited to a hard drive, compact disc, flash memory, non-volatile memory, volatile memory, magnetic diskette and so forth but does not include a transitory signal per se.

The processes described herein are not limited to the specific examples described. Rather, any of the processing blocks as described above may be re-ordered, combined or removed, performed in parallel or in serial, as necessary, to achieve the results set forth above.

The processing blocks associated with implementing the system may be performed by one or more programmable processors executing one or more computer programs to perform the functions of the system. All or part of the system may be implemented as, special purpose logic circuitry (e.g., an FPGA (field-programmable gate array) and/or an ASIC (application-specific integrated circuit)). All or part of the system may be implemented using electronic hardware circuitry that include electronic devices such as, for example, at least one of a processor, a memory, a programmable logic device or a logic gate.

Elements of different embodiments described herein may be combined to form other embodiments not specifically set forth above. Other embodiments not specifically described herein are also within the scope of the following claims.

What is claimed is:

1. A tutor model building system comprising:
   a predetermined learning interface configured to render a problem requiring a solution and an input device for the user to enter data showing actions taken to arrive at a solution into the system, wherein the problem is rendered using a tile metaphor that enables input from input devices having low screen resolutions;
   an author application to create new learning problems with a corresponding user interface;
   a model application to facilitate development of an example-tracing tutor model to implement one of the new learning problems comprising:
   a database of algorithms, each algorithm to provide a different approach to implement the new learning problem wherein multiple developers select algorithms and solution steps to implement one of the new learning problems to provide an automatically generated example-tracing tutor model with a corresponding behavior graph; and
   an editor to manually edit the corresponding behavior graph and to annotate the behavior graph with feedback and knowledge associations to provide at least one solution path.

2. The system as recited in claim 1 wherein the model application to generate a behavior graph operates to reduce the number of events by eliminating retracted events; operates to obtain a preferred sequence of states of events; operates to generate correct and incorrect edges; and operates to identify unordered groups.

3. The system as recited in claim 1 wherein the behavior graph includes a sequence of user interface events, each user interface event comprising a 2-tuple data element comprising an identifier and a data element associated with each user interface event.

4. The system as recited in claim 3 wherein edges in the behavior graph represent behavior events some of which are correct and lead to the next state while other are incorrect and lead back to the same state.

5. The system as recited in claim 4 wherein edges are also annotated with a data field of events and may be annotated with additional information such as element identifiers for readability.

6. The system as recited in claim 5 wherein a sequential organization of solution state is shown and the behavior graph showcases an alternate path between the states.

7. The system as recited in claim 1 wherein the predetermined learning interface is determined by a subject matter developer of the problem and a predetermined algorithm is selected to combine the plurality of behavior demonstrations.

8. The system as recited in claim 7 wherein corresponding generalization and annotation of the behavior graph is determined by the predetermined algorithm selected.

9. The system as recited in claim 1 wherein the administrative application comprises:
   a curriculum management panel to organize collections of learning problems;
   a resource manager panel to manage content resources including graphics available to author learning problems; and
   a task list panel to track content development tasks.

10. A method for developing a tutor model comprising:
    using a predetermined learning interface, rendering a problem using a tile metaphor that enables input from input devices with low screen resolution and capturing various actions taken by users to arrive at a solution to the problem;
    generating a behavior demonstration for the various actions taken for each user solution comprising multiple users selecting algorithms and solution steps to implement a new learning problem;
    combining the behavior demonstrations to provide an automatically generalized example-tracing tutor model with a corresponding behavior graph; and
    manually editing the corresponding behavior graph and annotating the behavior graph with feedback and knowledge associations to provide at least one solution path.

11. The method as recited in claim 10 wherein the step of combining the behavior demonstrations to one behavior graph comprises:
    reducing the number of events by eliminating retracted events;
    obtaining a preferred sequence of states of events;
    generating correct and incorrect edges; and
    identifying unordered groups.

12. The method as recited in claim 11 wherein correct edges in the behavior graph represent behavior events which are correct and lead to the next state while incorrect edges represent behavior events which are incorrect and lead back to the same state.

13. The method as recited in claim 11 wherein edges are also annotated with a data field of events and may be annotated with additional information such as element identifiers for readability.

14. The method as recited in claim 11 wherein the step of combining the behavior demonstrations to one behavior graph includes using a predetermined algorithm determined by subject matter.

15. An article comprising:
    a non-transitory computer-readable medium that stores computer-executable instructions, the instructions causing a machine to:
    using a predetermined learning interface, render a problem using a tile metaphor that enables input from input devices with low screen resolution and capture various actions taken by a user to arrive at a solution to the problem;
    generate a behavior demonstration for the various actions taken for each user solution comprising multiple users selecting algorithms and solution steps to implement a new learning problem;
    combine the behavior demonstrations to provide an automatically generalized example-tracing tutor model with a corresponding generated behavior graph; and
    providing the generated behavior graph to a tutor authoring tool so that a developer can manually edit the corresponding generated behavior graph and annotate the behavior graph with feedback and knowledge associations to provide at least one solution path.

16. The article recited in claim 15 wherein combining the behavior demonstrations to generate a behavior graph comprises:
- reducing the number of events by eliminating retracted events;
- obtaining a preferred sequence of states of events;
- generating correct and incorrect edges; and
- identifying unordered groups.

17. The article recited in claim 15 wherein correct edges in the behavior graph represent behavior events which are correct and lead to the next state while incorrect edges represent behavior events which are incorrect and lead back to the same state.

18. The system as recited in claim 5 further comprising an authoring tool and the authoring tool supports a number of additional annotations on both the nodes and the edges.

19. The system as recited in claim 9 wherein the curriculum management panel and resource management panel are shared among developers.

20. The system as recited in claim 18 wherein incorrect edges may be annotated with corrective feedback provided to learners when a trace traverses that edge and nodes are annotated with hints for tutoring applications and with skills for student modeling and assessment applications.

* * * * *